United States Patent
Li et al.

US010880416B2

(10) Patent No.: US 10,880,416 B2
(45) Date of Patent: Dec. 29, 2020

(54) FOLDABLE DISPLAY DEVICE

(71) Applicant: HTC Corporation, Taoyuan (TW)

(72) Inventors: Ching-Ho Li, Taoyuan (TW); Hsiu-Fan Ho, Taoyuan (TW); Ching-Feng Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/731,045

(22) Filed: Dec. 31, 2019

(65) Prior Publication Data

US 2020/0267245 A1 Aug. 20, 2020

Related U.S. Application Data

(60) Provisional application No. 62/807,242, filed on Feb. 19, 2019.

(51) Int. Cl.
H04M 1/00 (2006.01)
H04M 1/02 (2006.01)
E05D 7/00 (2006.01)
E05D 3/12 (2006.01)
G06F 1/16 (2006.01)
E05D 11/00 (2006.01)

(52) U.S. Cl.
CPC .......... *H04M 1/0216* (2013.01); *E05D 3/122* (2013.01); *E05D 7/00* (2013.01); *E05D 11/0054* (2013.01); *G06F 1/1652* (2013.01); *H04M 1/0268* (2013.01); *E05Y 2900/606* (2013.01)

(58) Field of Classification Search
CPC .. H04M 1/0216; H04M 1/0268; G06F 1/1652

USPC ...................................................... 455/575.3
See application file for complete search history.

(56) References Cited

U.S. PATENT DOCUMENTS 9,905,795 B2 * 2/2018 Matsueda ........... H04M 1/0268
10,054,990 B1 * 8/2018 Harmon ................ G06F 1/1679
10,551,880 B1 * 2/2020 Ai .......................... G06F 1/1641
(Continued)

FOREIGN PATENT DOCUMENTS

CN 108322567 7/2018
KR 20180030422 3/2018
(Continued)

OTHER PUBLICATIONS

"Office Action of Taiwan Counterpart Application", dated Jul. 22, 2020 p. 1-p. 3.

*Primary Examiner* — April G Gonzales
(74) *Attorney, Agent, or Firm* — JCIPRNET

(57) ABSTRACT

A foldable display device has a flexible display panel, a support module, and at least one positioning module. The support module has a middle platform and a pair of side platforms. The positioning module has a pair of positioning gears respectively fixed to the intermediate platform on a pair of gear axes parallel to each other and a pair of planetary gears respectively fixed to the pair of side platforms on a pair of gear axes parallel to each other. The pair of planetary gears are respectively engaged with the pair of positioning gears to respectively move around the pair of positioning gears along a pair of motion paths, so that the pair of side platforms are switched between a flattened state and a folded state with respect to the intermediate platform to flatten or bend the flexible display panel.

10 Claims, 31 Drawing Sheets

(56) References Cited

U.S. PATENT DOCUMENTS

| | | | | |
|---|---|---|---|---|
| 2006/0034601 A1* | 2/2006 | Andersson | ....... | H04N 5/225251 396/157 |
| 2011/0157780 A1* | 6/2011 | Wang | .................... | G06F 1/1681 361/679.01 |
| 2011/0289726 A1* | 12/2011 | Zhang | .................... | G06F 1/1681 16/250 |
| 2011/0289728 A1* | 12/2011 | Wang | .................... | G06F 1/1681 16/337 |
| 2012/0096678 A1* | 4/2012 | Zhang | .................... | G06F 1/1681 16/302 |
| 2017/0118853 A1* | 4/2017 | Lee | ........................ | G09F 9/301 |
| 2018/0059740 A1* | 3/2018 | Kato | .................... | G06F 1/1681 |
| 2018/0150107 A1* | 5/2018 | Lee | ....................... | G06F 1/1681 |
| 2018/0292860 A1* | 10/2018 | Siddiqui | ................ | G06F 1/1618 |
| 2019/0243426 A1* | 8/2019 | Morrison | ............. | E05D 11/0054 |
| 2020/0174530 A1* | 6/2020 | Wu | ........................ | G09G 5/006 |

FOREIGN PATENT DOCUMENTS

| | | |
|---|---|---|
| TW | I345034 | 7/2011 |
| TW | 201901342 | 1/2019 |

* cited by examiner

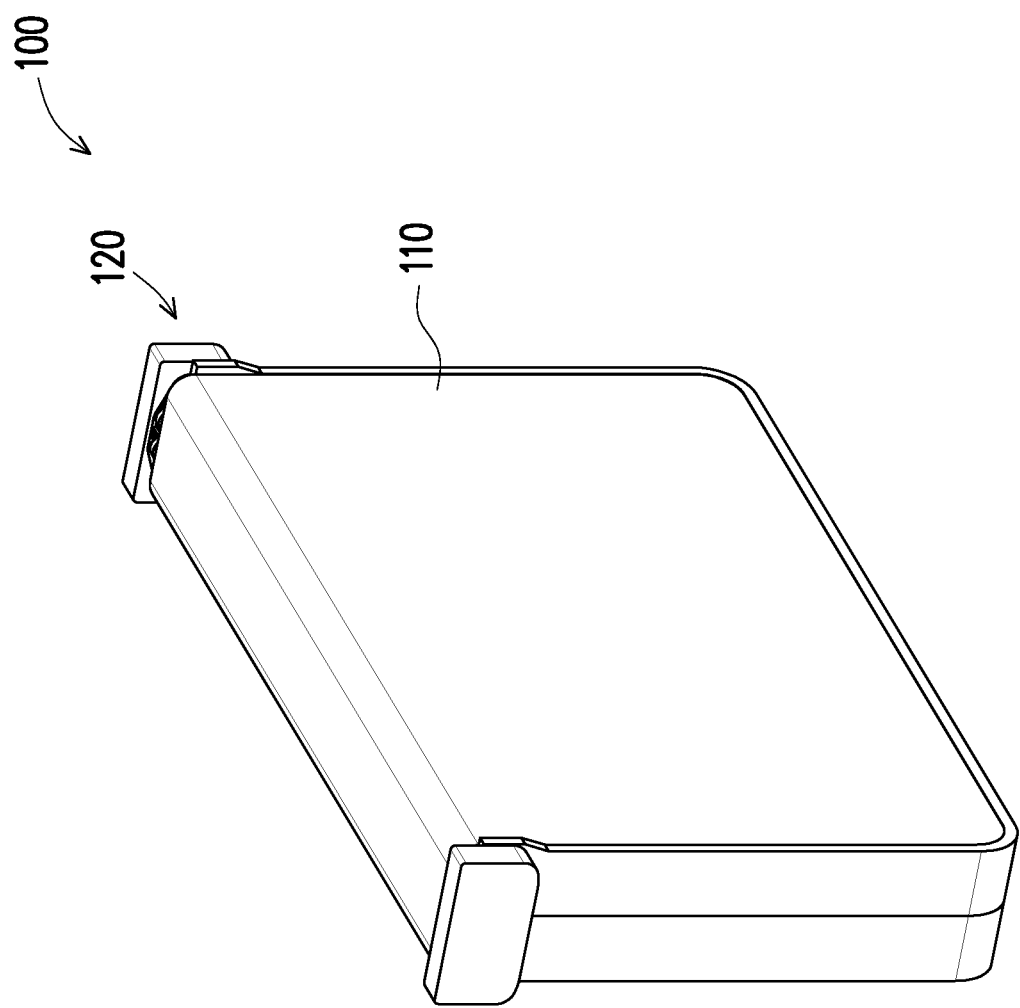

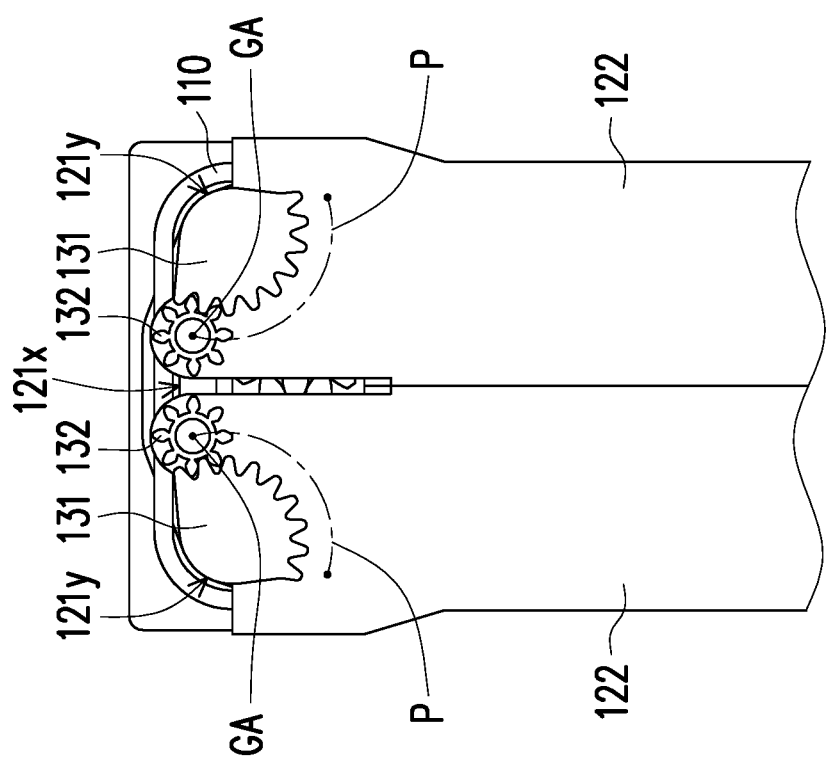

FOLDABLE DISPLAY DEVICE

CROSS-REFERENCE TO RELATED APPLICATION

This application claims the priority benefit of U.S. provisional application Ser. No. 62/807,242, filed on Feb. 19, 2019. The entirety of the above-mentioned patent application is hereby incorporated by reference herein and made a part of this specification.

BACKGROUND OF THE INVENTION

Field of the Invention

The application relates to a display device, and more particularly to a foldable display device, such as a foldable smart phone.

Description of Related Art

As far as foldable electronic products are concerned, when the screen is folded, the screen may be bent inward or outward. When the screen is bent inward, the bendable screen is provided inside the body, and the space inside the body is emptied via a retract mechanism to accommodate the bent portion of the screen. In addition, when the screen is bent outward, the bendable screen may still be exposed outside the body after folding to display real-time information. Compared to the screen bent outward, the screen bent inward requires a separate screen outside the body to display real-time information.

SUMMARY OF THE INVENTION

The present application provides a foldable display device for providing a full-plane or half-plane display in a flattened state or a folded state, respectively.

The foldable display device of the present application includes a flexible display panel, a support module, and at least one positioning module. The support module includes an intermediate platform and a pair of side platforms. The intermediate platform has an intermediate support surface and a pair of guiding round surfaces respectively located on two opposite sides of the intermediate support surface to support the flexible display panel. Each of the pair of side platforms has a side support surface to support the flexible display panel. The positioning module includes a pair of positioning gears and a pair of planetary gears. The pair of positioning gears are fixed to the intermediate platform. The pair of planetary gears are respectively fixed to the pair of side platforms on a pair of gear axes parallel to each other and engaged with the pair of positioning gears to respectively move around the pair of positioning gears along a pair of motion paths, so that the pair of side platforms are switched between a flattened state and a folded state with respect to the intermediate platform to flatten or bend the flexible display panel. The pair of motion paths are a pair of involutes located on a geometric plane perpendicular to the pair of gear axes and symmetrical to each other.

Based on the above, in the embodiments of the present application, the foldable display device may be switched to a flattened state or a folded state to provide a full-plane or half-plane display. By setting the motion paths of the planetary gears of the positioning module with respect to the positioning gears, the possibility of the flexible display panel being excessively stretched or crumpled during the switching process may be reduced to improve the service life of the flexible display panel and the flatness of the appearance.

BRIEF DESCRIPTION OF THE DRAWINGS

FIG. 1A to FIG. 1C are top perspective views of a foldable display device in a flattened, converted, and folded state according to an embodiment of the invention, respectively.

FIG. 9A to FIG. 9C are diagrams of a positioning module of the foldable display device of FIG. 1A in a flattened, converted, and folded state, respectively.

DESCRIPTION OF THE EMBODIMENTS

Figure 1A:
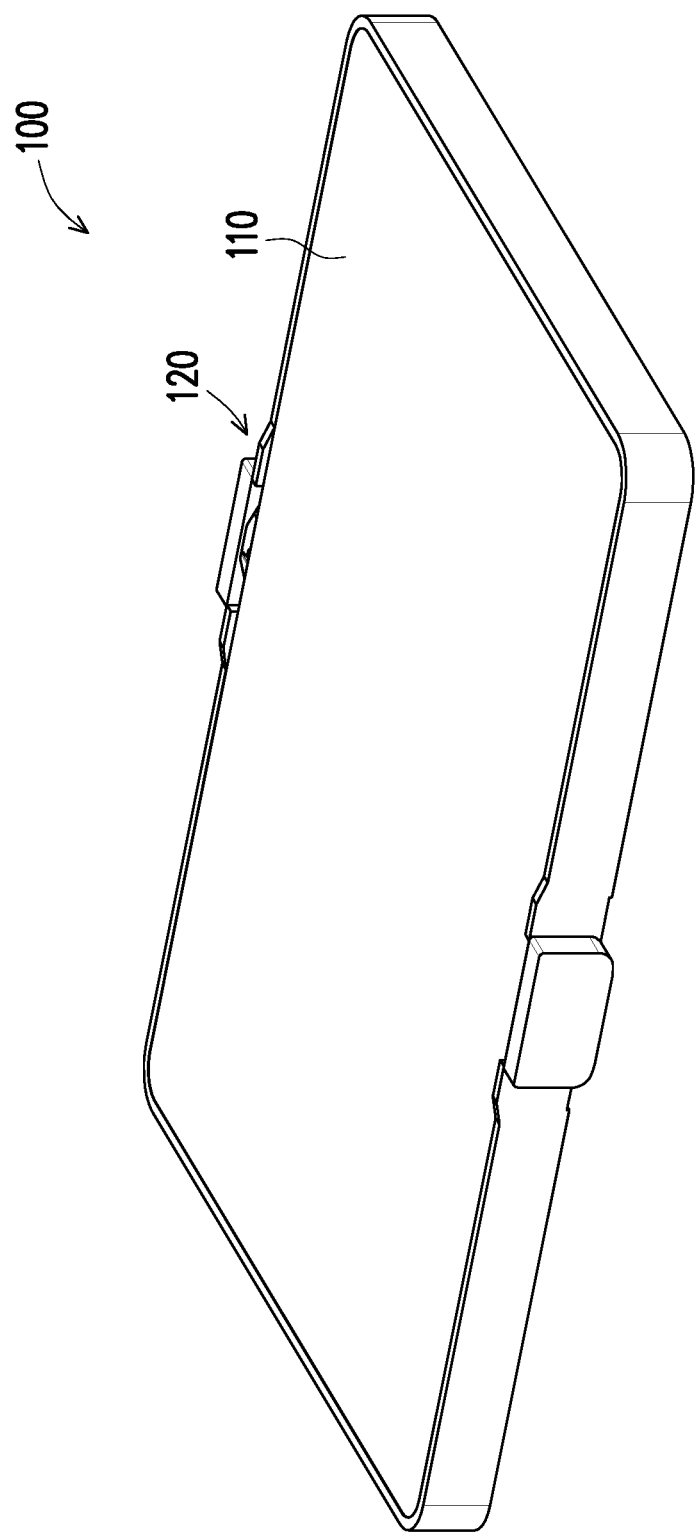
Figure 1B:
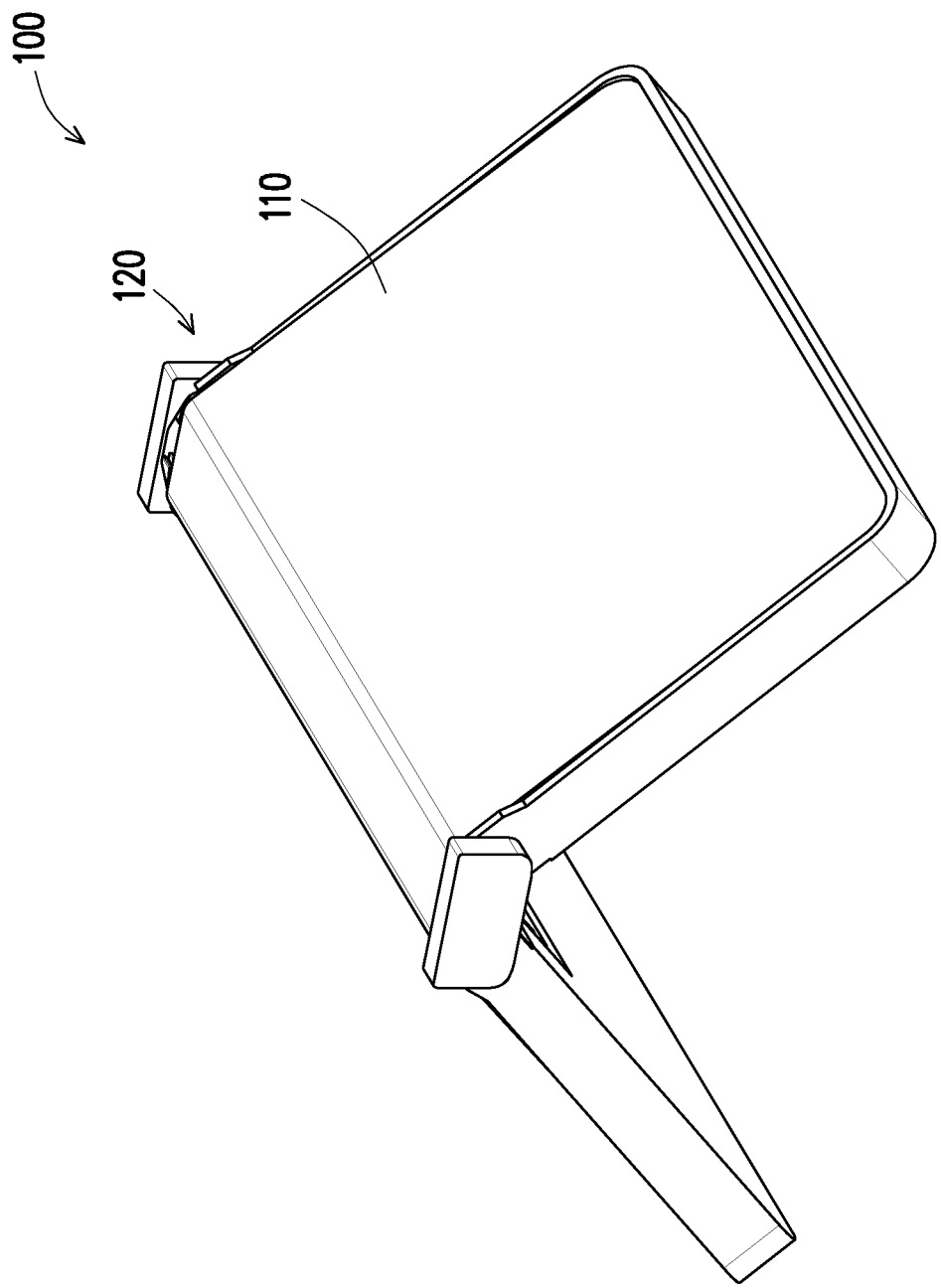
Figure 2A:
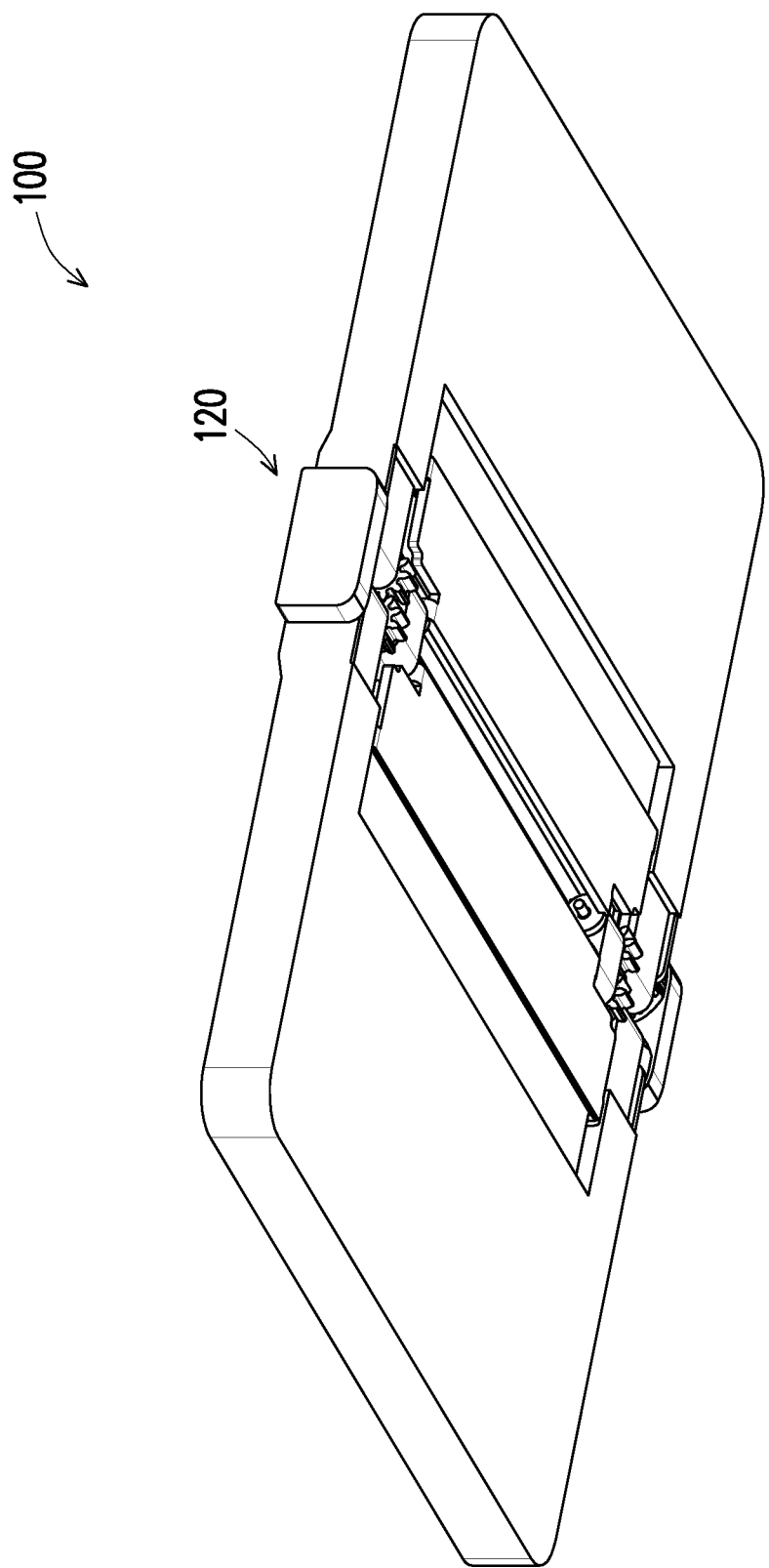
FIG. 2A to FIG. 2C are bottom perspective views of the foldable display device of FIG. 1A in a flattened, converted, and folded state, respectively.
Figure 2B:
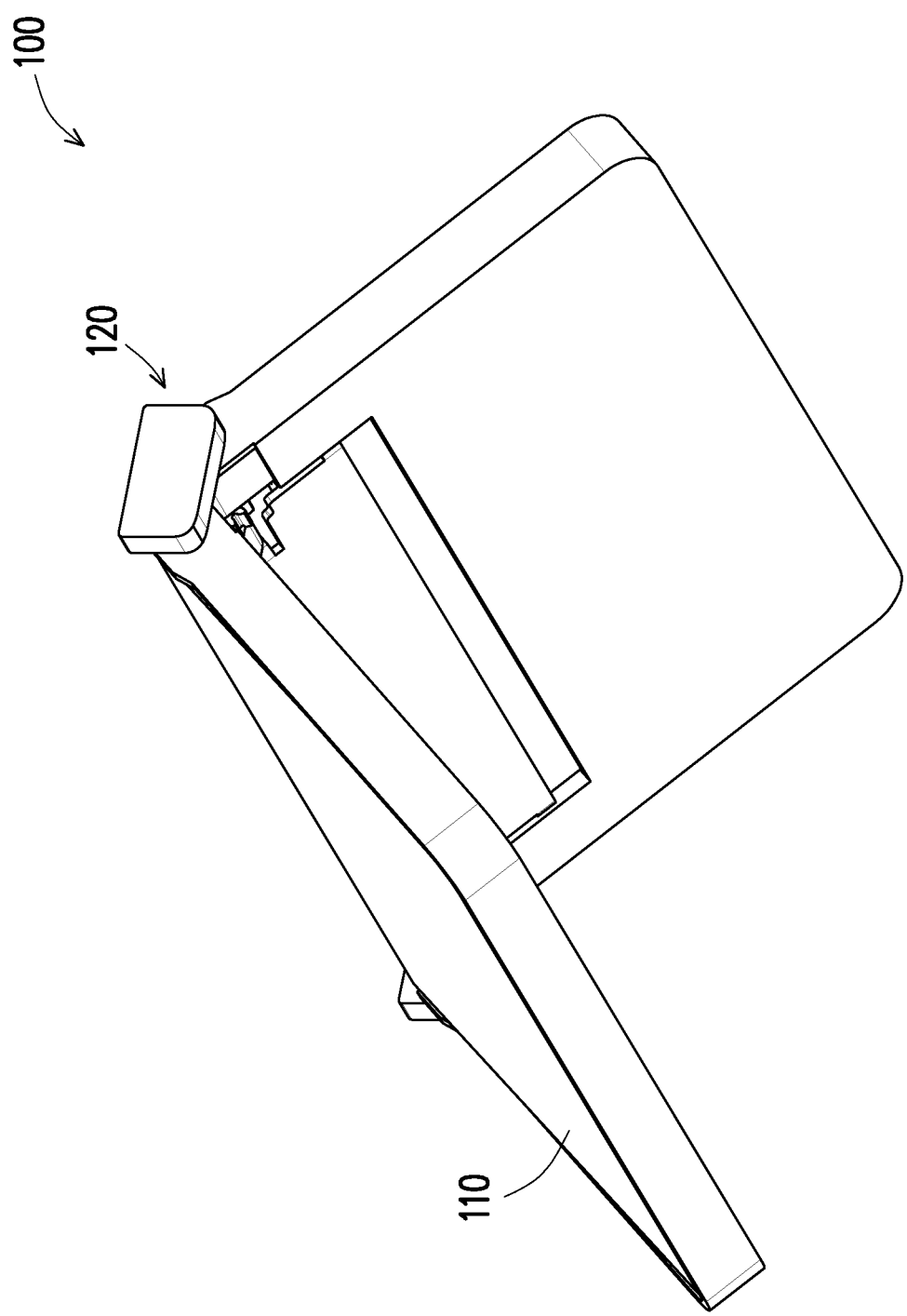
Figure 2C:
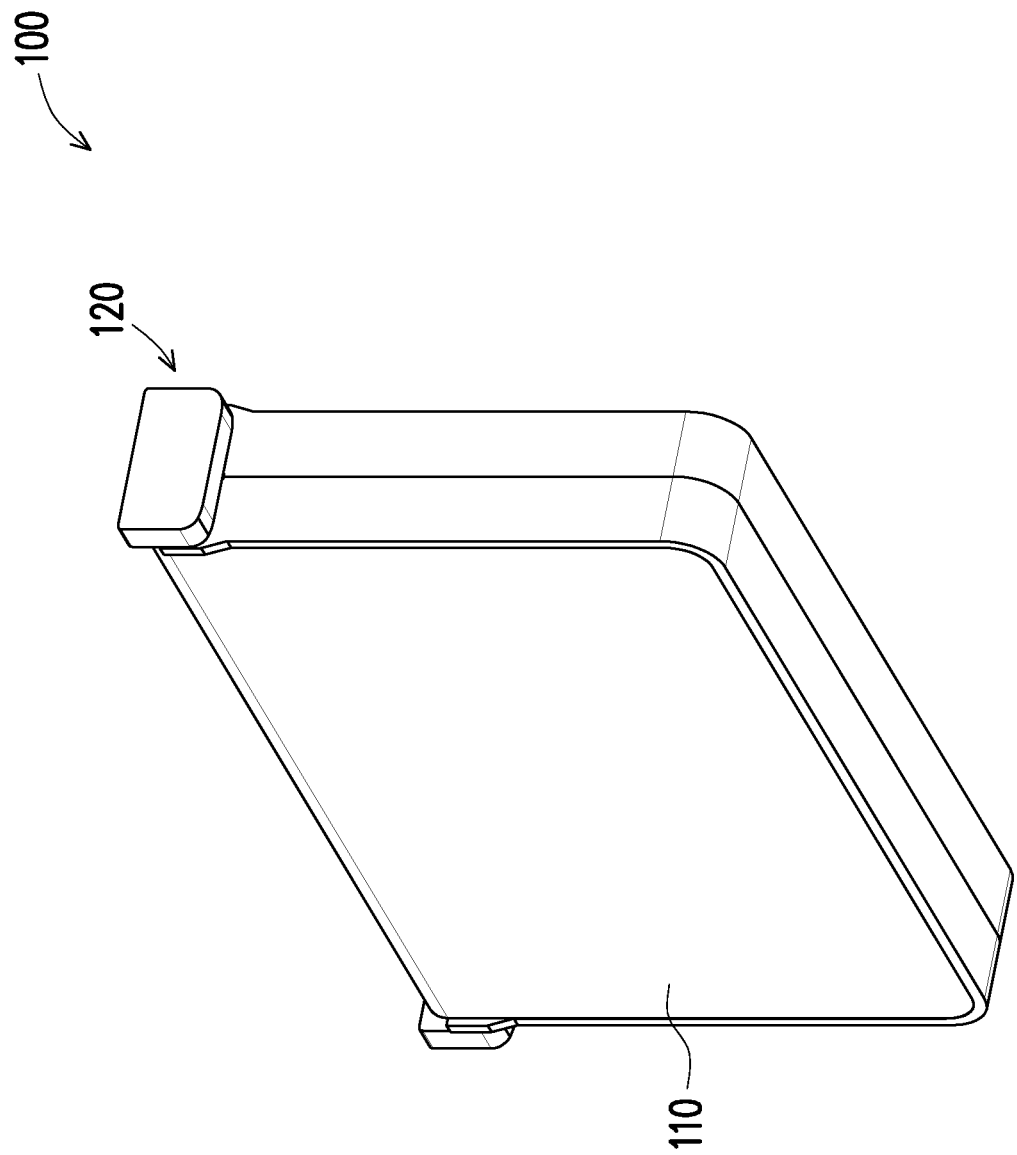

Please refer to FIG. 1A to FIG. 1C and FIG. 2A to FIG. 2C. In the present embodiment, a foldable display device 100 is provided, which is, for example, a foldable smart phone or tablet computer. The foldable display device 100 includes a flexible display panel 110 and a support module 120. The support module 120 is used for supporting the flexible display panel 110 to provide a full-plane display in the flattened state of FIG. 1A and FIG. 2A, or to provide two half-planes and a strip-shaped plane located between the two half-planes in the folded state of FIG. 1C and FIG. 2C. In addition, FIG. 1B and FIG. 2B show a state in which the foldable display device 100 is switched between the flattened state and the folded state.

Figure 3:
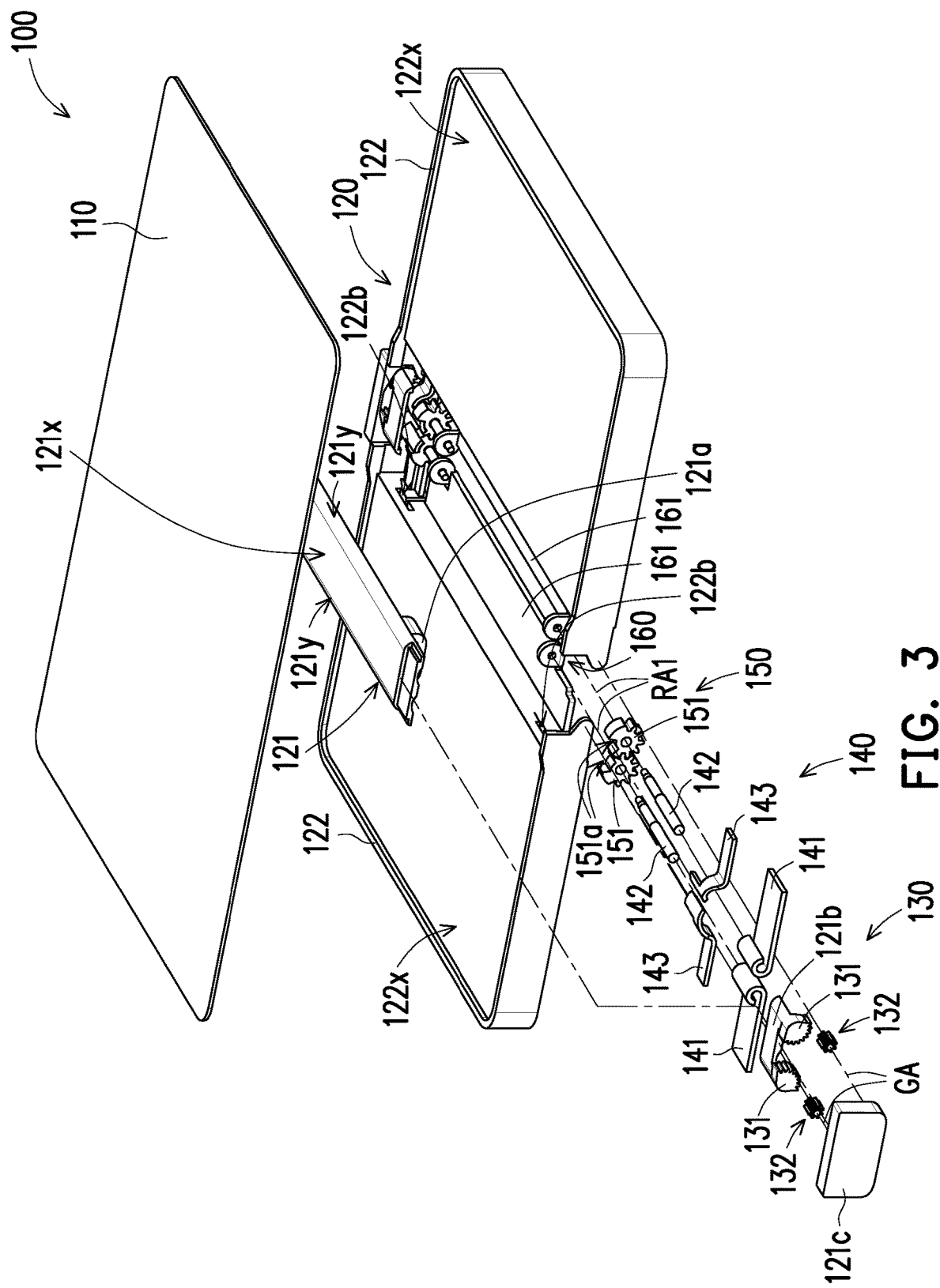
FIG. 3 is an exploded view of the foldable display device of FIG. 1A.
Figure 4:
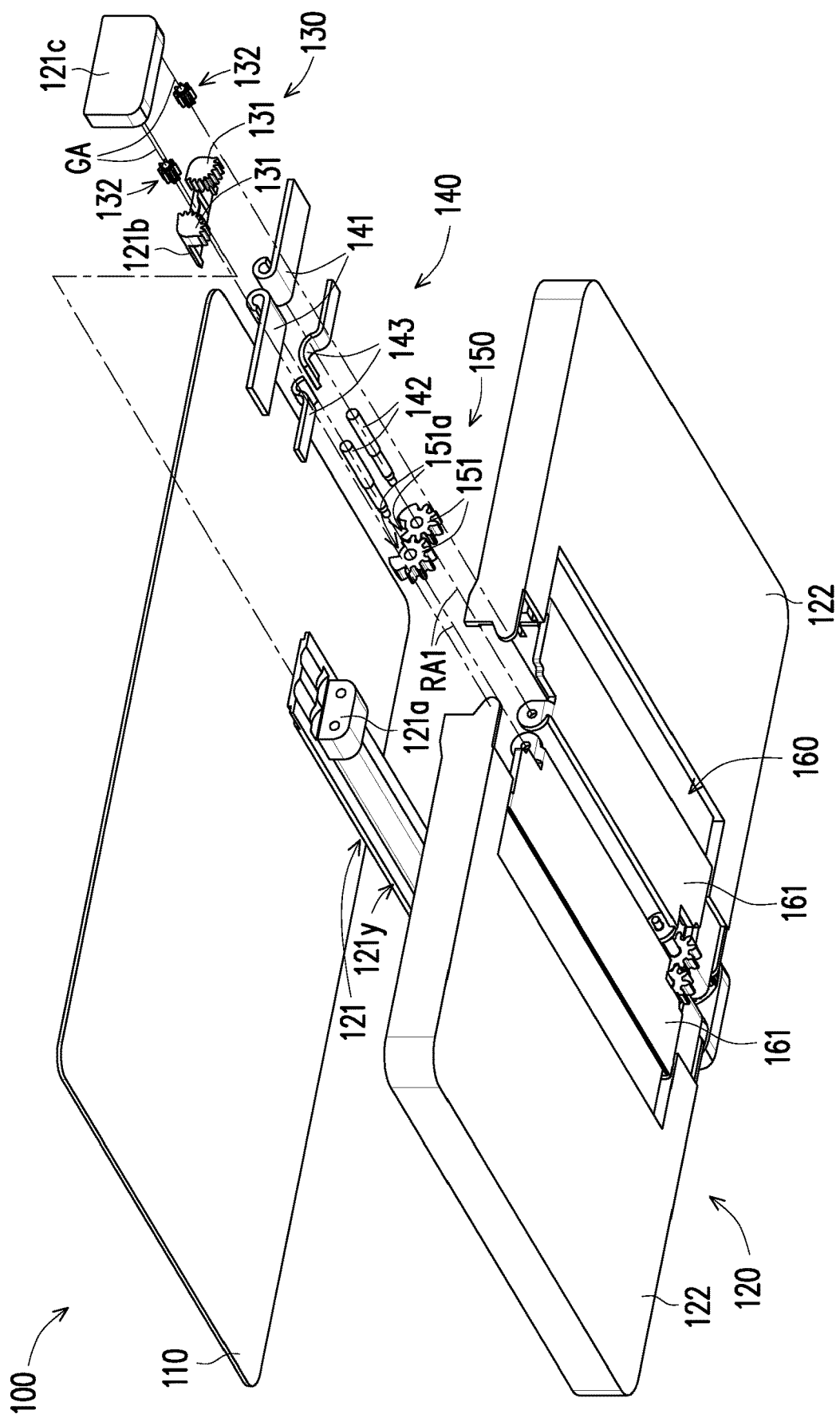
FIG. 4 is an exploded view of the foldable display device of FIG. 2A.
Figure 5A:
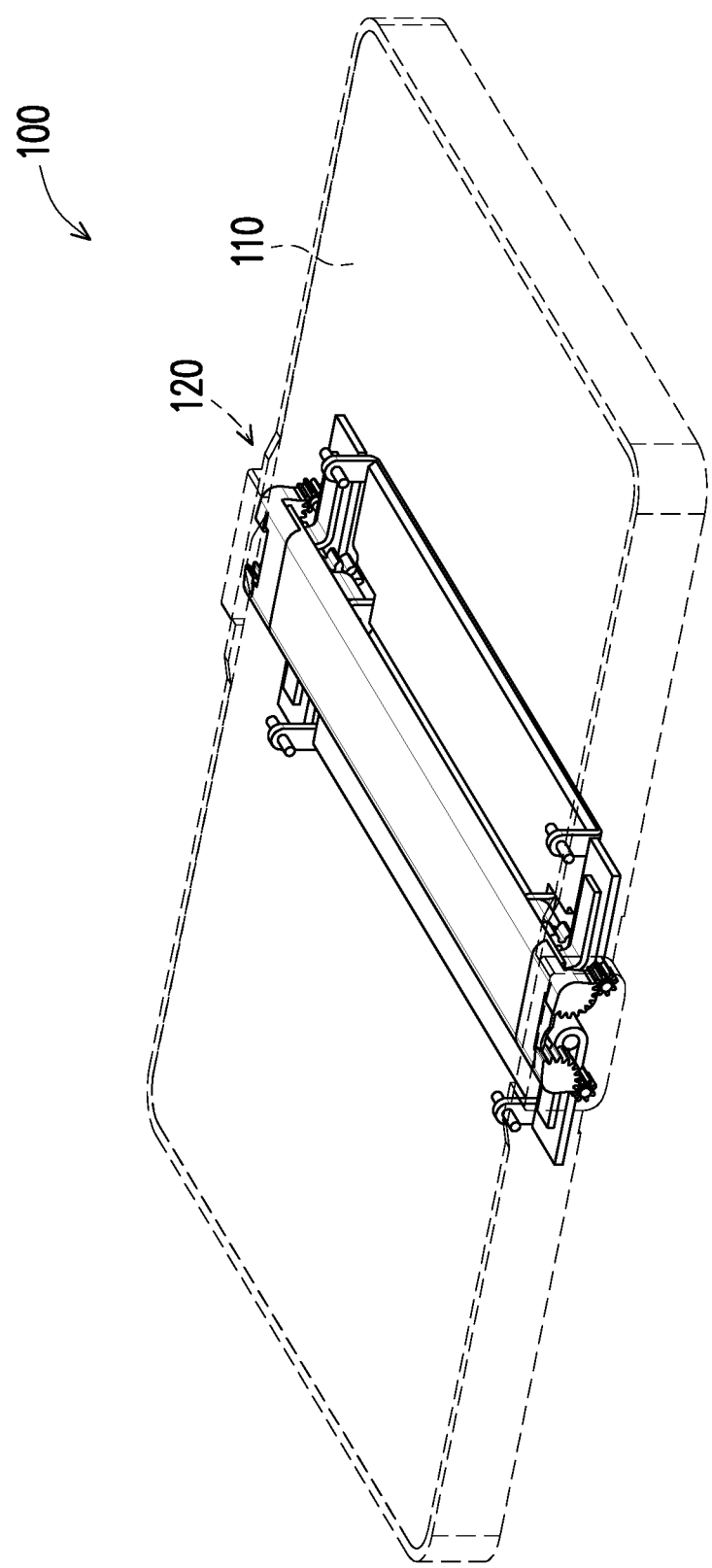
FIG. 5A to FIG. 5C are top perspective views of the foldable display device of FIG. 1A in a flattened, converted, and folded state, respectively.
Figure 5B:
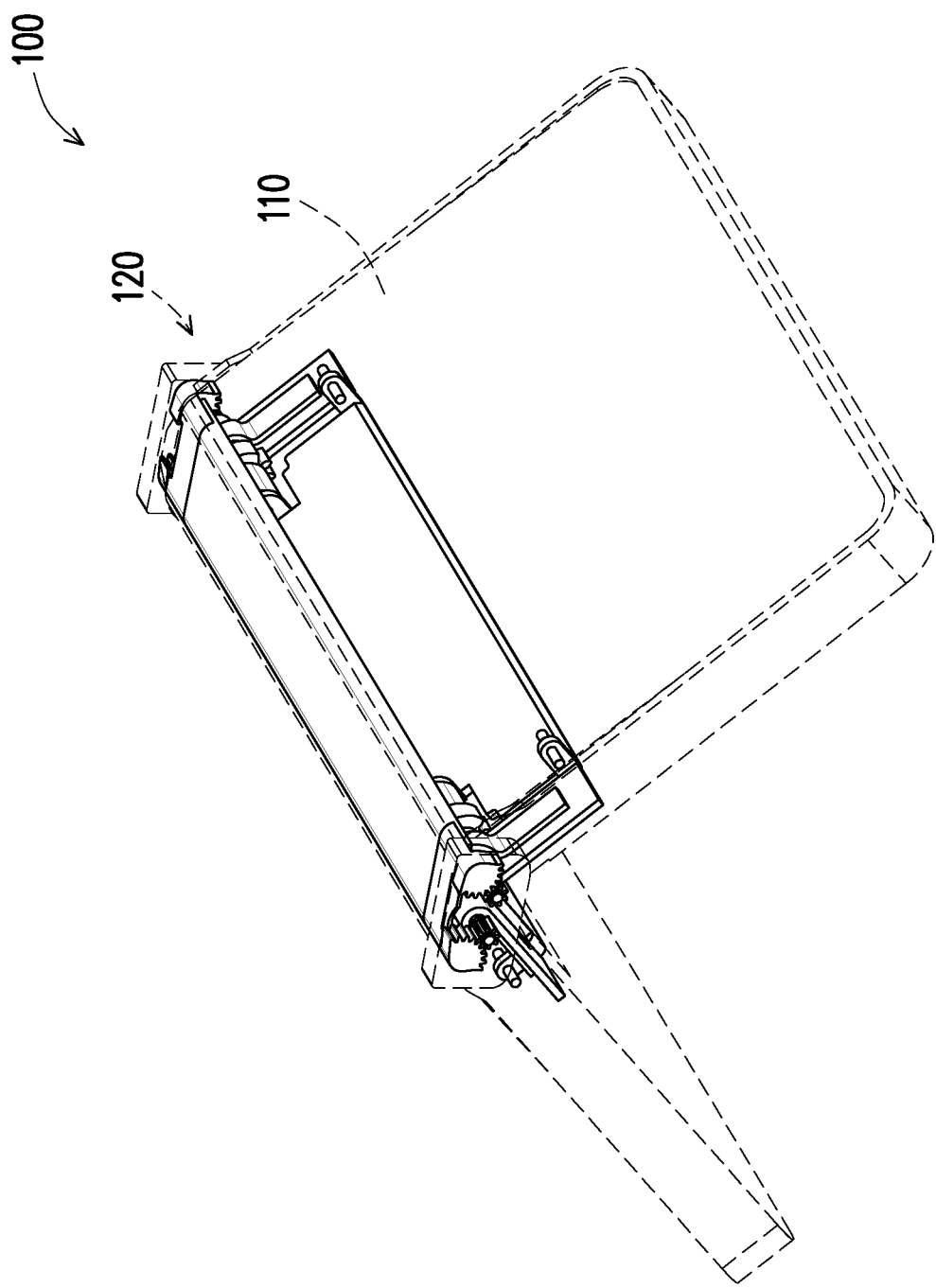
Figure 5C:
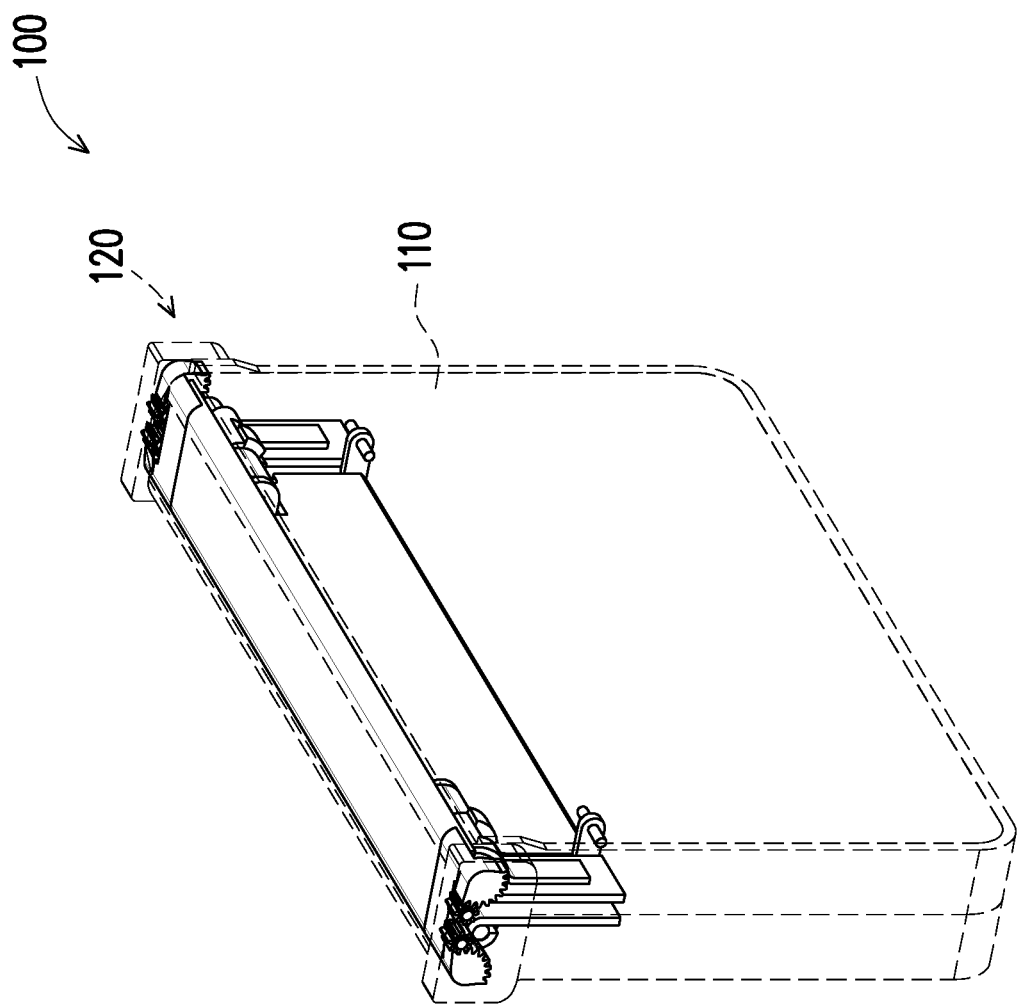
Figure 6A:
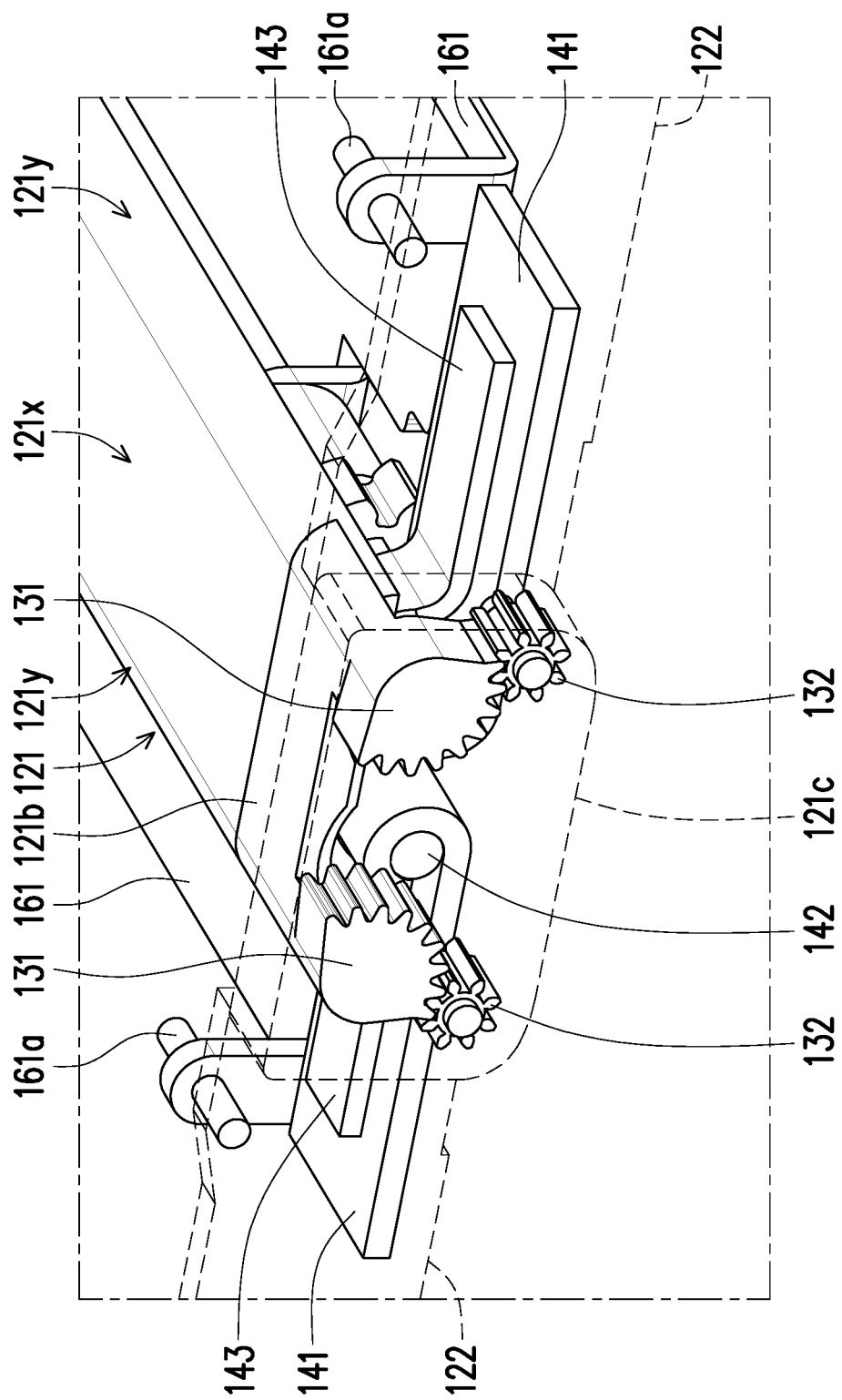
FIG. 6A to FIG. 6C are partially enlarged views of the foldable display device of FIG. 5A to FIG. 5C, respectively.
Figure 6B:
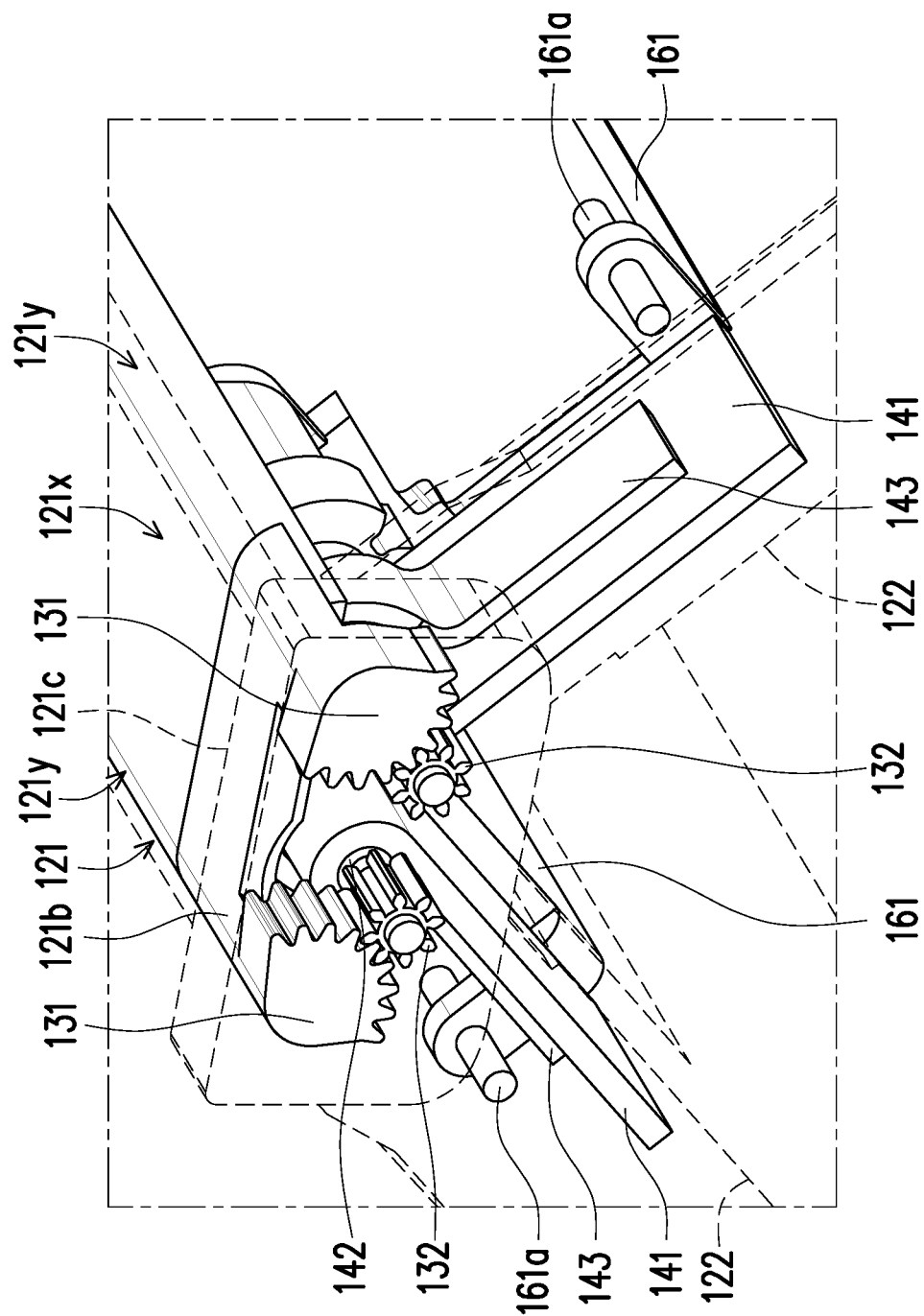
Figure 6C:
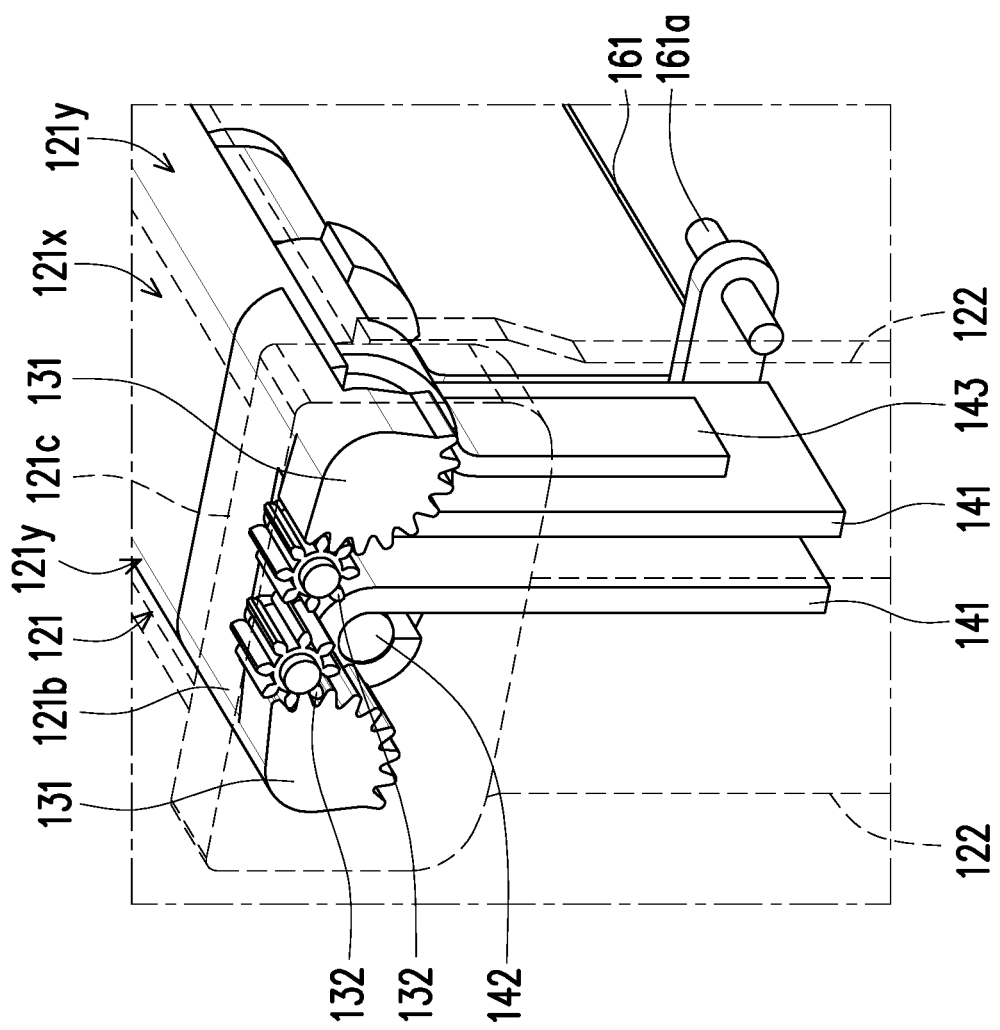
Figure 7A:
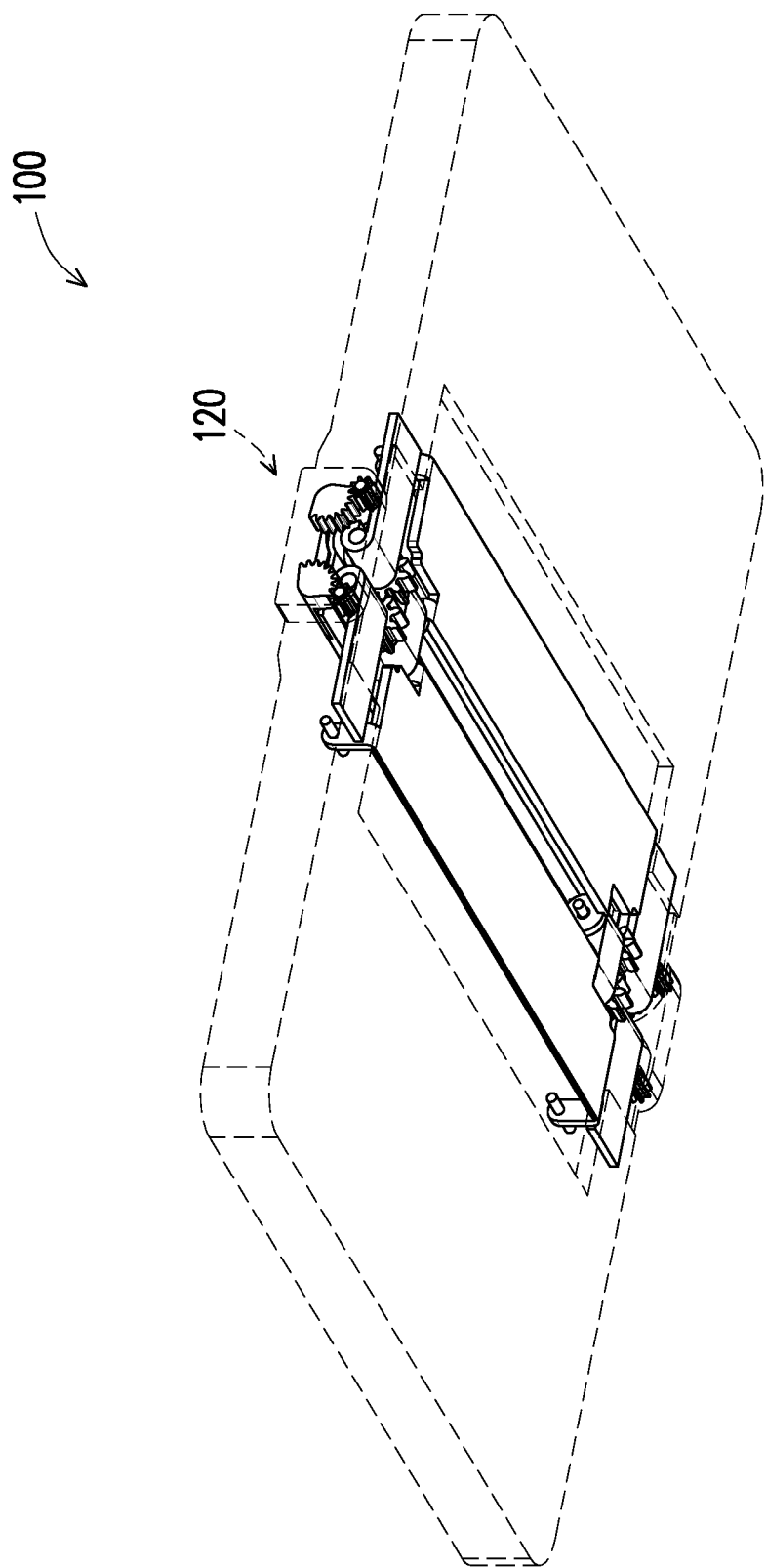
FIG. 7A to FIG. 7C are bottom perspective views of the foldable display device of FIG. 2A in a flattened, converted, and folded state, respectively.
Figure 7B:
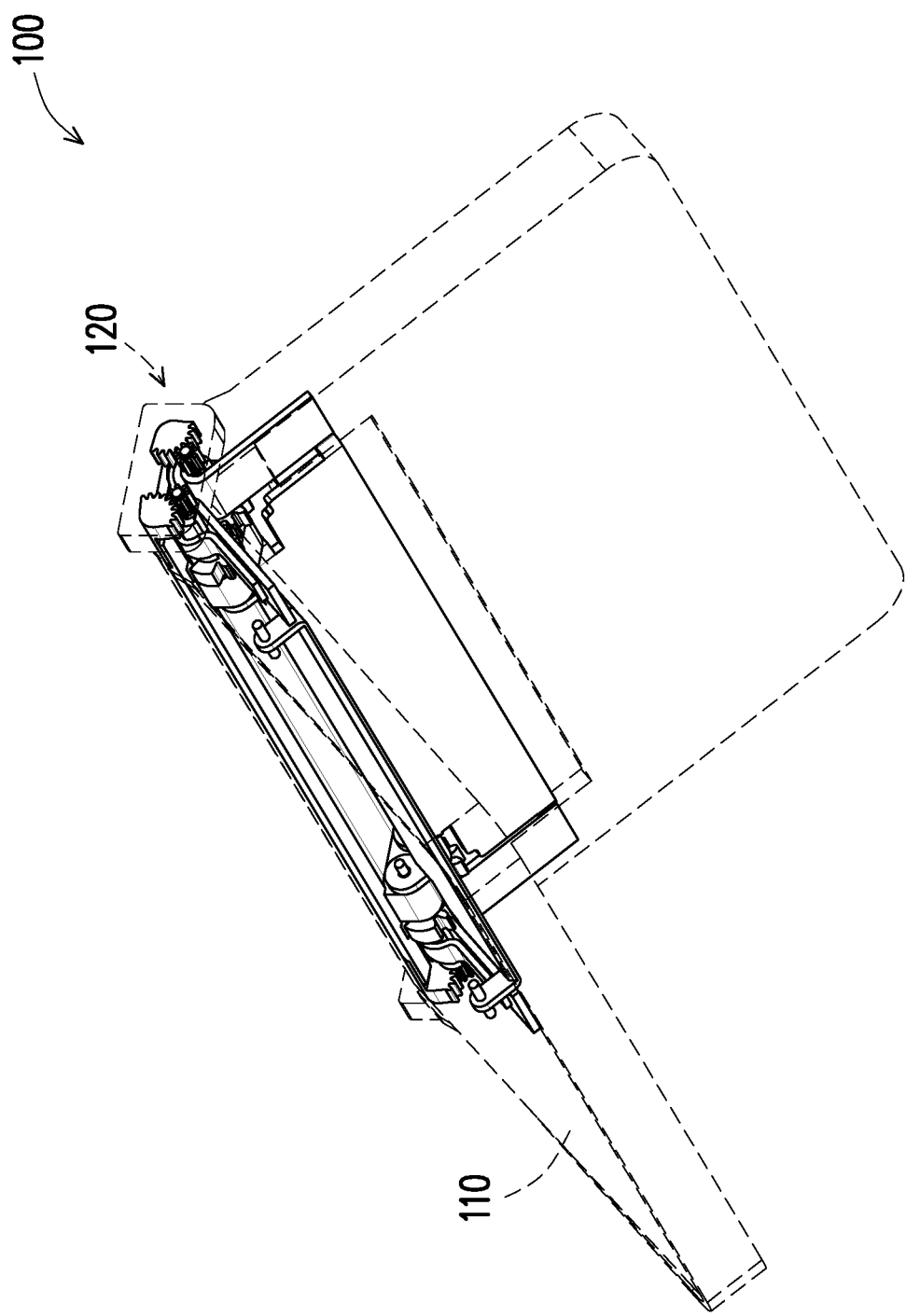
Figure 7C:
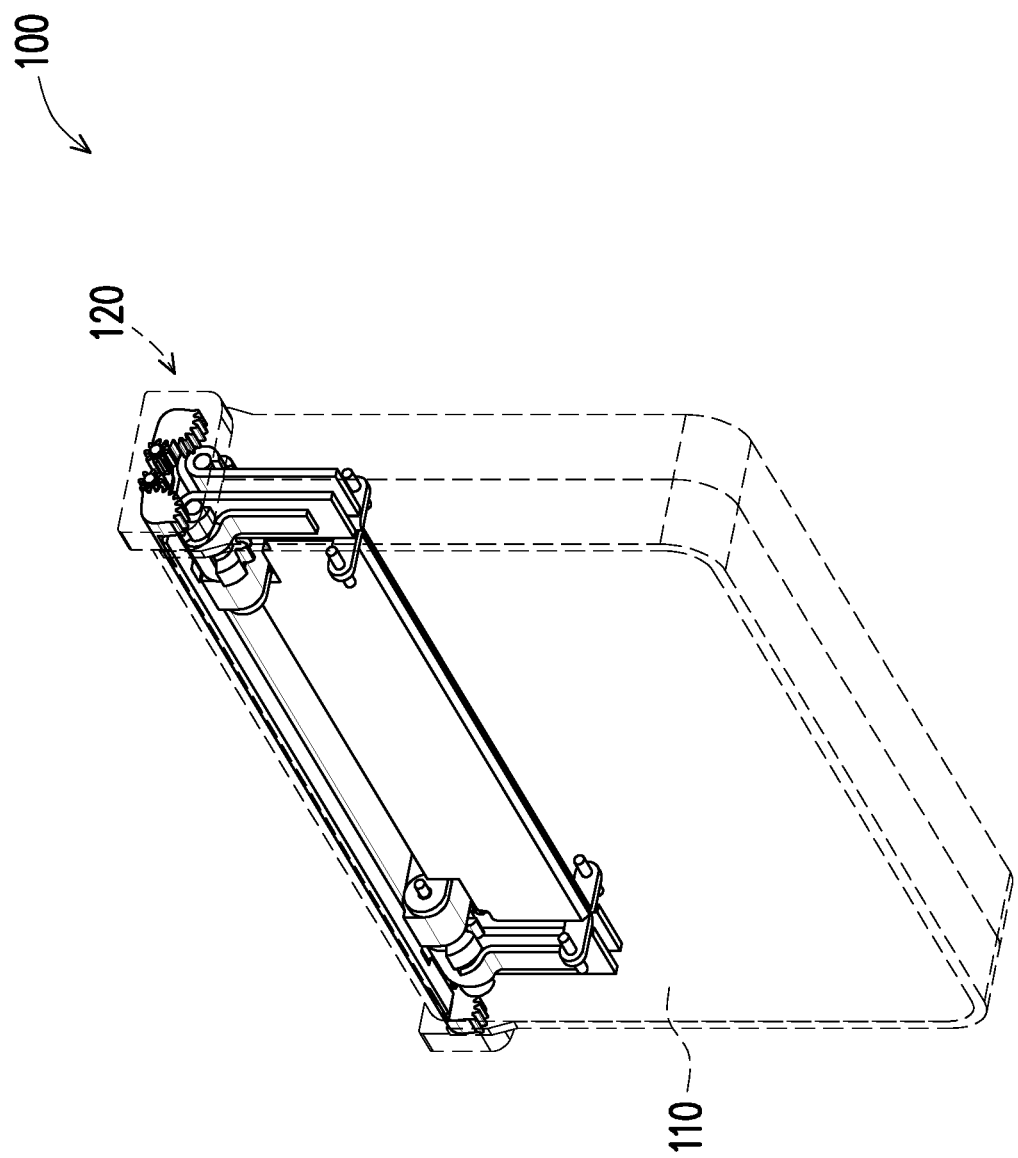
Figure 8A:
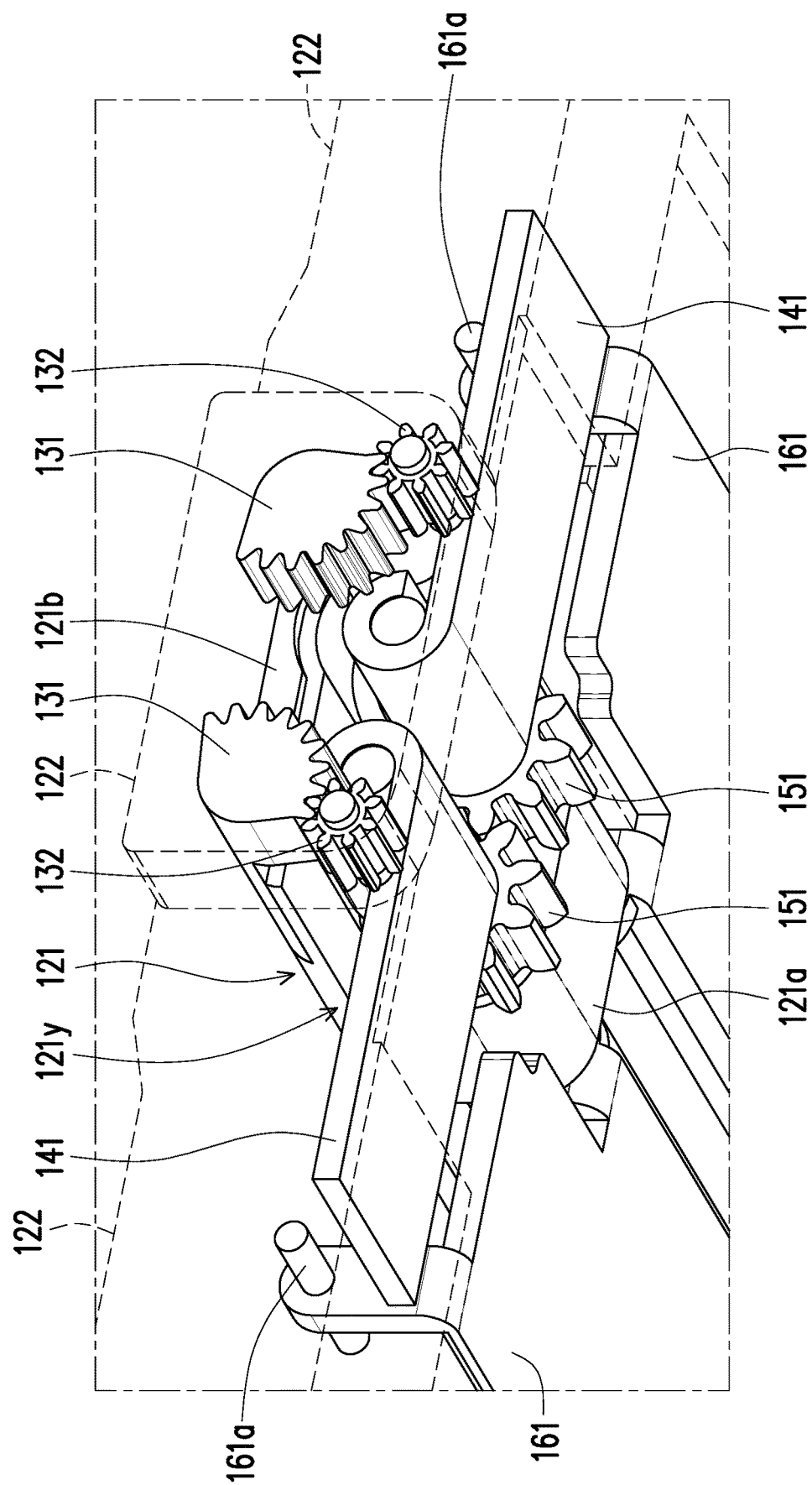
FIG. 8A to FIG. 8C are partially enlarged views of the foldable display device of FIG. 7A to FIG. 7C, respectively.
Figure 8B:
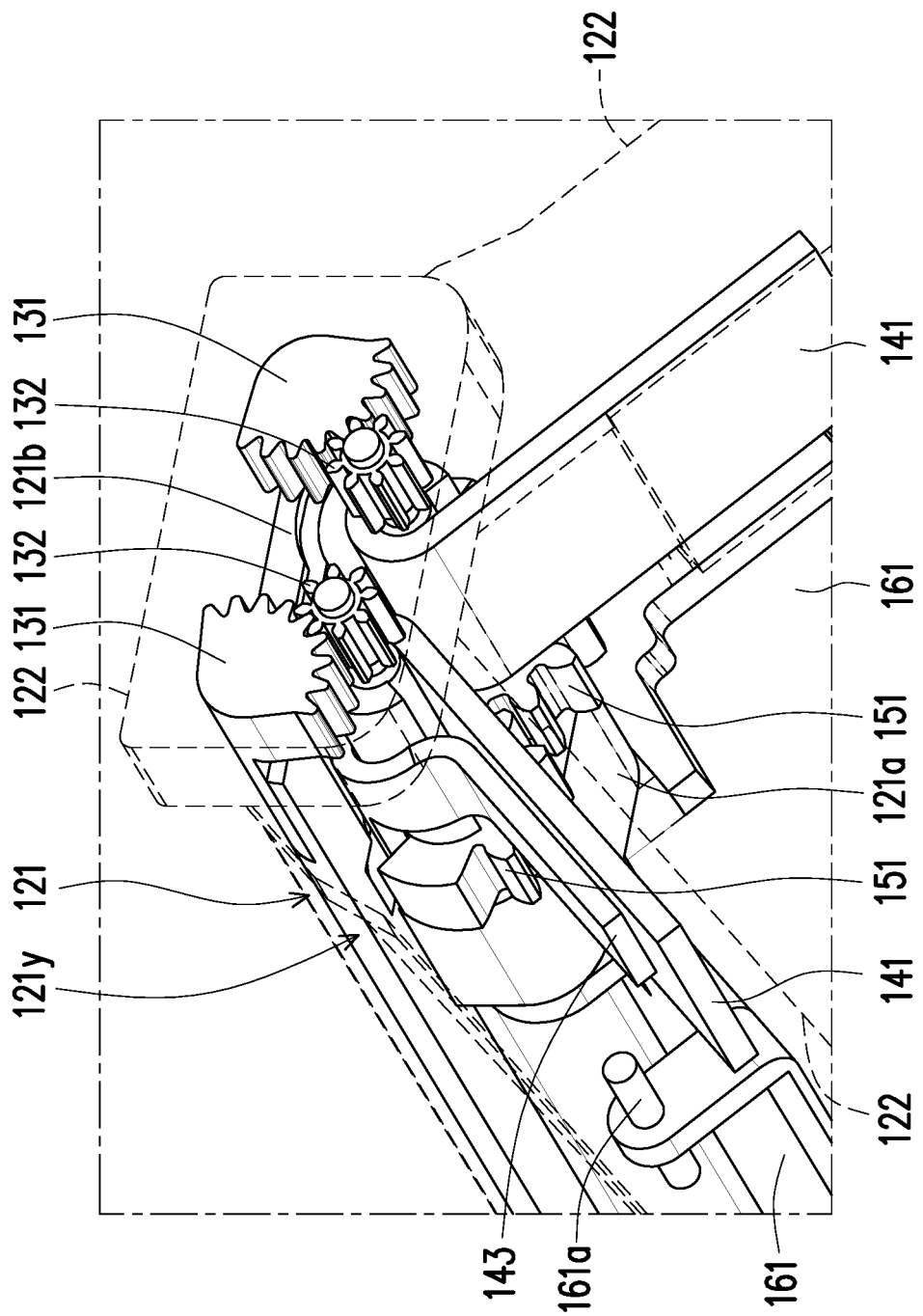
Figure 8C:
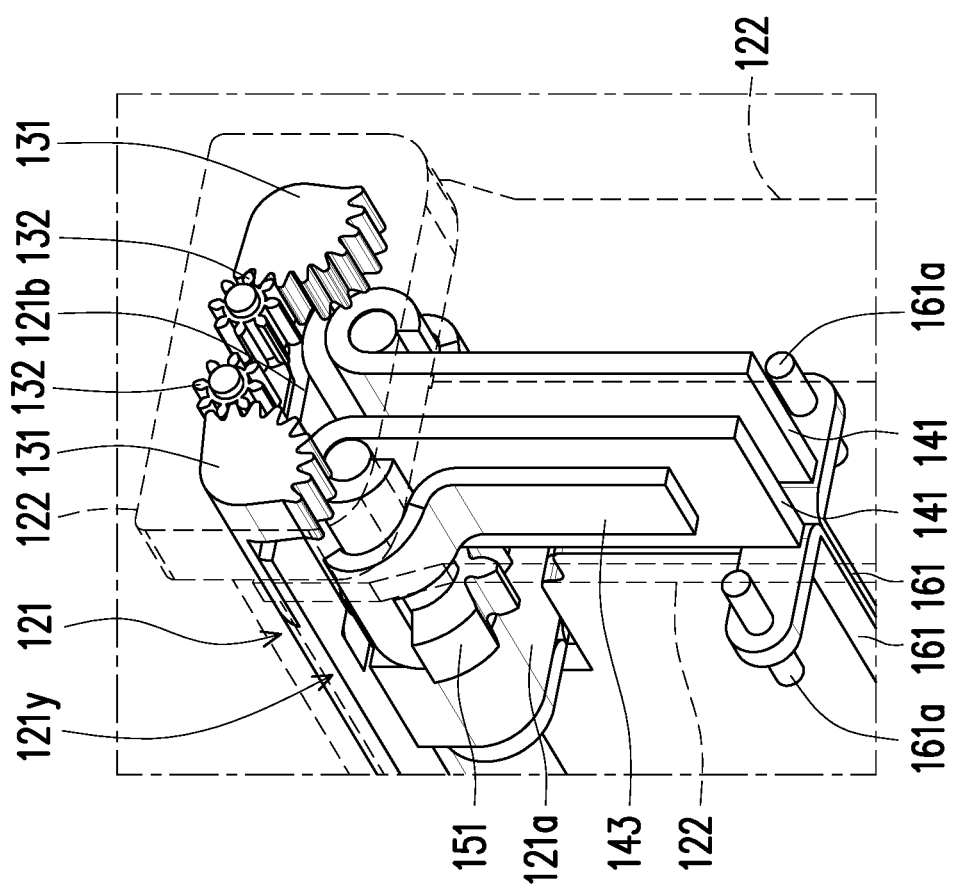

Please refer to FIG. 3 and FIG. 4. The support module 120 of the foldable display device 100 includes an intermediate platform 121 and a pair of side platforms 122.

The intermediate platform 121 has an intermediate support surface 121x and a pair of guiding round surfaces 121y respectively located on two opposite sides of the intermediate support surface 121x to support the flexible display panel 110. Each of the pair of side platforms 122 has a side support surface 122x to support the flexible display panel 110.

Please refer to FIG. 3 and FIG. 4. The foldable display device 100 further includes at least one positioning module 130. In the present embodiment, a pair of positioning modules 130 are used, and one positioning module 130 on a single side is used for illustration. The positioning module 130 is connected to the support module 120, i.e., disposed between the intermediate platform 121 and the pair of side platforms 122 to ensure that during the switching process of the support module 120 (that is, the intermediate platform 121 and the pair of side platforms 122) between the flattened state and the folded state, the flexible display panel 110 is not excessively stretched, and the possibility that the flexible display panel 110 is wrinkled is reduced.

Please refer to FIG. 3, FIG. 4, FIG. 5A to FIG. 5C, FIG. 6A to FIG. 6C, FIG. 7A to FIG. 7C, and FIG. 8A to FIG. 8C. The positioning module 130 includes a pair of positioning gears 131. The pair of positioning gears 131 are fixed to the intermediate platform 121. In the present embodiment, the intermediate platform 121 has a pair of connecting portions 121b. The pair of positioning gears 131 may be connected to the connecting portions 121b and connected to the intermediate platform 121 via the connecting portions 121b. In addition, the positioning module 130 further includes a pair of planetary gears 132. The pair of planetary gears 132 are respectively fixed to the pair of side platforms 122 on a pair of gear axes GA parallel to each other and engaged with the pair of positioning gears 131. The intermediate platform 121 also has a pair of end covers 121c respectively fixed to the corresponding connecting portions 121b.

Figure 9A:
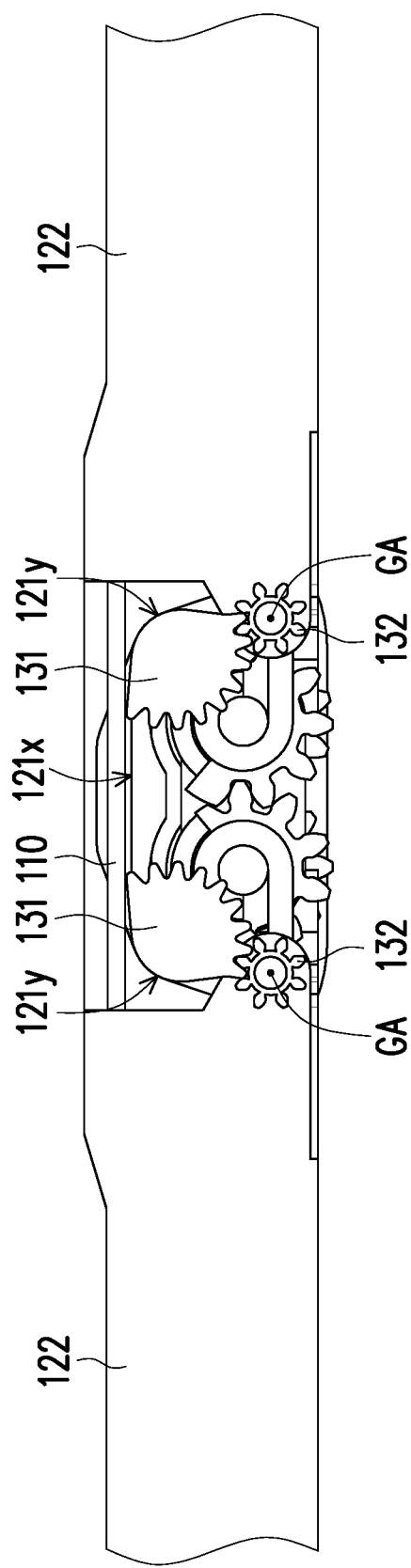
Figure 9B:
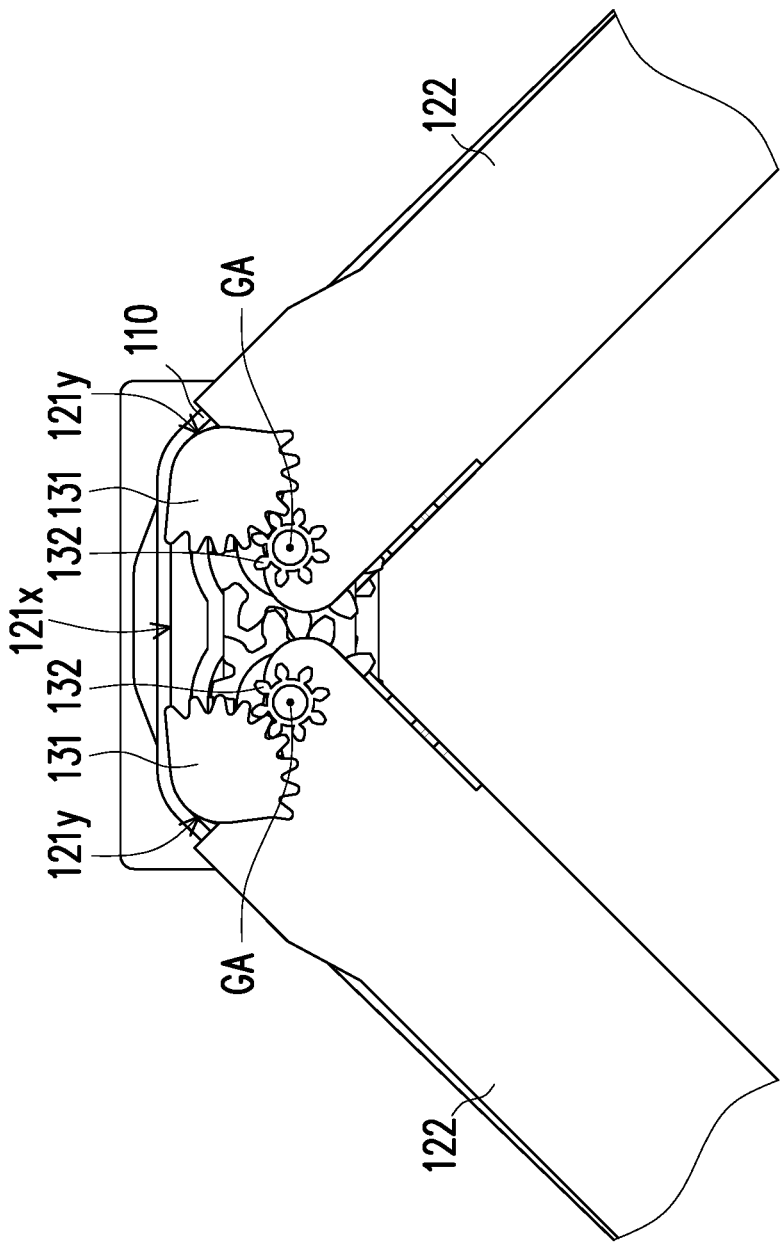

Please refer to FIG. 9A to FIG. 9C. The pair of planetary gears 132 are respectively moved around the pair of positioning gears 131 along a pair of motion paths P as shown in FIG. 9C so that the pair of side platforms 122 are switched between the flattened state (FIG. 9A) and the folded state (FIG. 9C) with respect to the intermediate platform 121 to flatten or bend the flexible display panel 110. It should be mentioned that as shown in FIG. 9C, the pair of motion paths P are a pair of involutes located on a geometric plane perpendicular to the pair of gear axes GA and symmetrical to each other. Therefore, the flexible display panel 110 is not readily wrinkled in the flattened state (FIG. 9A), and is not readily excessively stretched in the folded state (FIG. 9C).

In more detail, since the pair of positioning gears 131 are fixed to the intermediate platform 121, when the pair of planetary gears 132 and the pair of positioning gears 131 start to move relative to each other and the pair of planetary gears 132 are moved from the position of FIG. 9A to FIG. 9C along the motion paths P, the pair of positioning gears 131 drive the intermediate platform 121 to move away from the flexible display panel 110 to prevent the flexible display panel 110 from being stretched excessively.

Similarly, when the pair of planetary gears 132 and the pair of positioning gears 131 start to move relative to each other and the pair of planetary gears 132 are moved from the position of FIG. 9C to FIG. 9A along the motion paths P, the pair of positioning gears 131 drive the intermediate platform 121 to move toward the flexible display panel 110 to support the flexible display panel 110 and avoid wrinkles.

Due to the combination of the pair of planetary gears 132 and the pair of positioning gears 131, the foldable display device 100 may be more stable and smoother in the process of switching between the flattened state and the folded state. In addition, the combination of the pair of planetary gears 132 and the pair of positioning gears 131 also has a longer service life.

Please refer to FIG. 3 and FIG. 4. The foldable display device 100 may further include at least one rotating and sliding module 140. In the present embodiment, a pair of rotating and sliding modules 140 are used, and one rotating and sliding module 140 on a single side is used for illustration. The rotating and sliding module 140 is connected to the support module 120, i.e., disposed between the intermediate platform 121 and the pair of side platforms 122, so that the support module 120 (that is, the intermediate platform 121 and the pair of side platforms 122) is switched between the flattened state and the folded state.

Figure 10A:
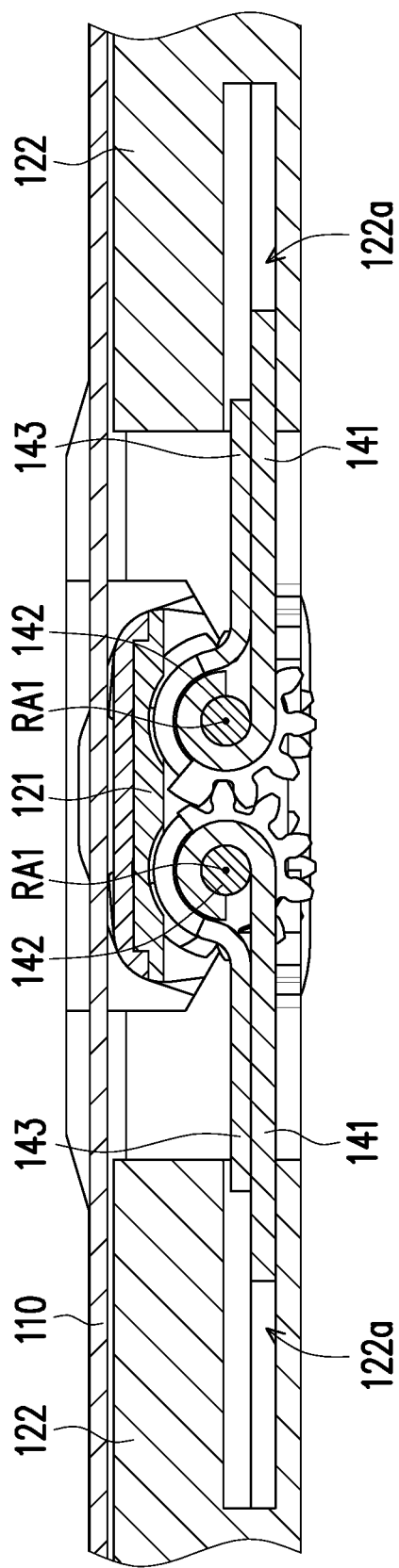
FIG. 10A to FIG. 10C are diagrams of the positioning module of the foldable display device of FIG. 1A in a flattened, converted, and folded state, respectively.

Please refer to FIG. 3, FIG. 4, FIG. 5A to FIG. 5C, FIG. 6A to FIG. 6C, FIG. 7A to FIG. 7C, and FIG. 8A to FIG. 8C. The rotating and sliding module 140 includes a pair of sliding members 141. The pair of sliding members 141 are respectively pivotally connected to the intermediate platform 121 on a pair of rotation axes (first rotation axes RA1) parallel to each other. Each of the pair of side platforms 122 has a translation sliding groove 122a (as shown in FIG. 10A), and the pair of sliding members 141 are respectively coupled to the pair of translation sliding grooves 122a. In the present embodiment, the rotating and sliding module 140 may include a pair of shafts 142 respectively coupled to a bearing portion 121a of the intermediate platform 121 along the pair of first rotation axes RA1. The pair of sliding members 141 may be respectively fixed to the pair of shafts 142, so that the pair of sliding members 141 may each be rotated with respect to the intermediate platform 121 and slide in the pair of translation sliding grooves 122a.

Figure 10B:
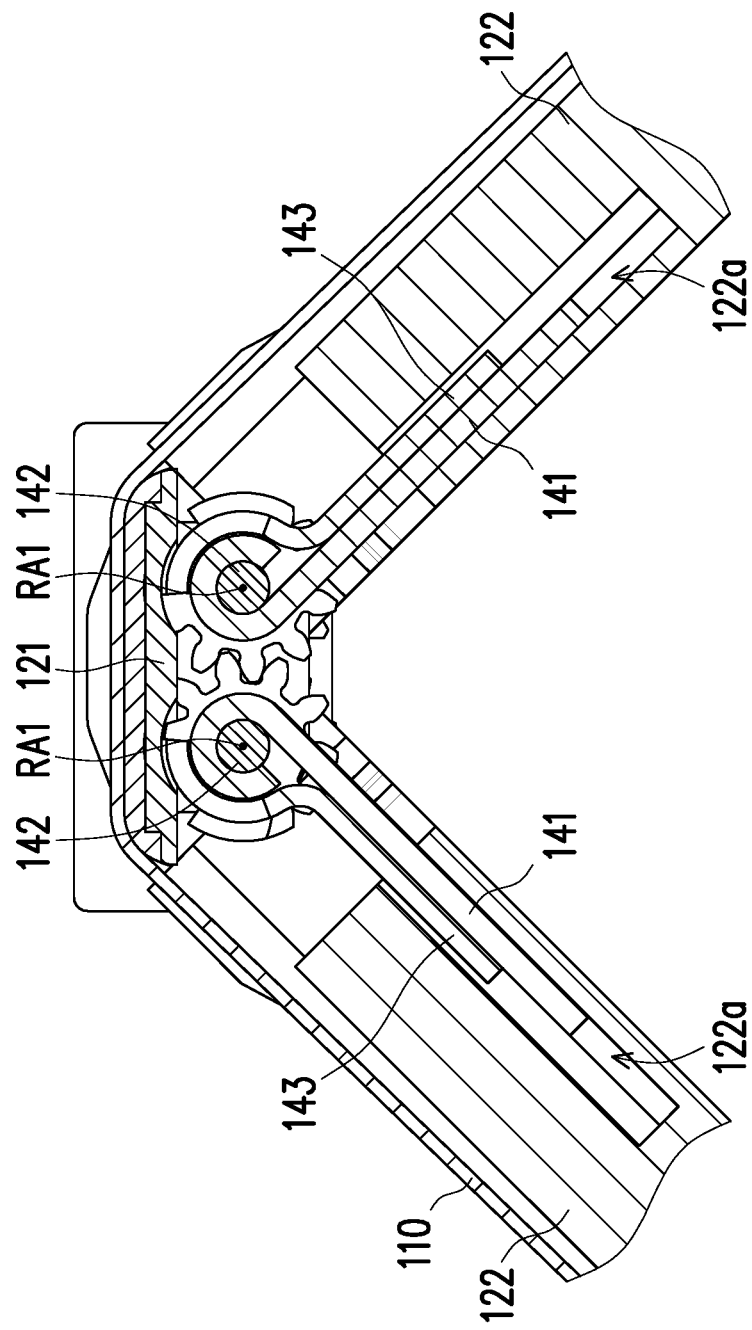
Figure 10C:
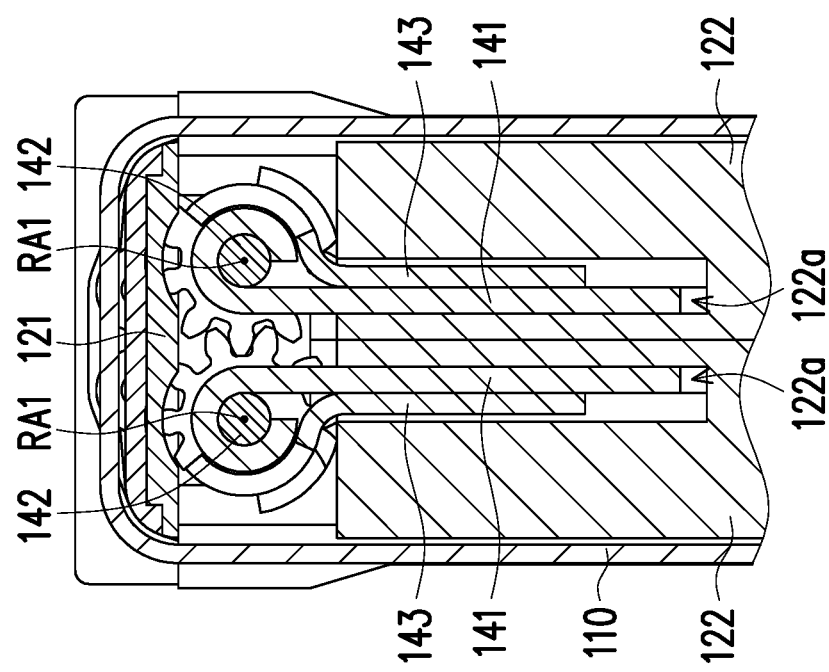

Please refer to FIG. 10A to FIG. 10C. When the pair of side platforms 122 are respectively rotated with respect to the pair of intermediate platforms 121 on the pair of first rotation axes RA1, the pair of sliding members 141 allow the pair of side platforms 122 to be relatively close to or away from the intermediate platforms 121. Therefore, the flexible display panel 110 is not wrinkled in the flattened state (FIG. 10A), and is not excessively stretched in the folded state (FIG. 10C).

Please refer to FIG. 3, FIG. 4, FIG. 5A to FIG. 5C, FIG. 6A to FIG. 6C, FIG. 7A to FIG. 7C, FIG. 8A to FIG. 8C, and FIG. 11A to FIG. 11C. The foldable display device 100 may further include at least one synchronous module 150. One pair of synchronous modules 150 are used in the present embodiment, and one synchronous module 150 on a single side is used for illustration. The synchronous module 150 is disposed between the pair of side platforms 122 so that the pair of side platforms 122 are moved simultaneously with respect to the intermediate platform 121. In the present embodiment, the synchronous module 150 includes a pair of synchronous gears 151. In another embodiment, the synchronous module 150 may also include a plurality of synchronous gears 151 sequentially coupled to each other. In addition, in other embodiments, other mechanisms having a synchronous function are used instead. Therefore, via the synchronous module 150, the pair of side platforms 122 may be expanded or closed at the same angle during the switching process between the flattened state and the folded state.

Figure 11A:
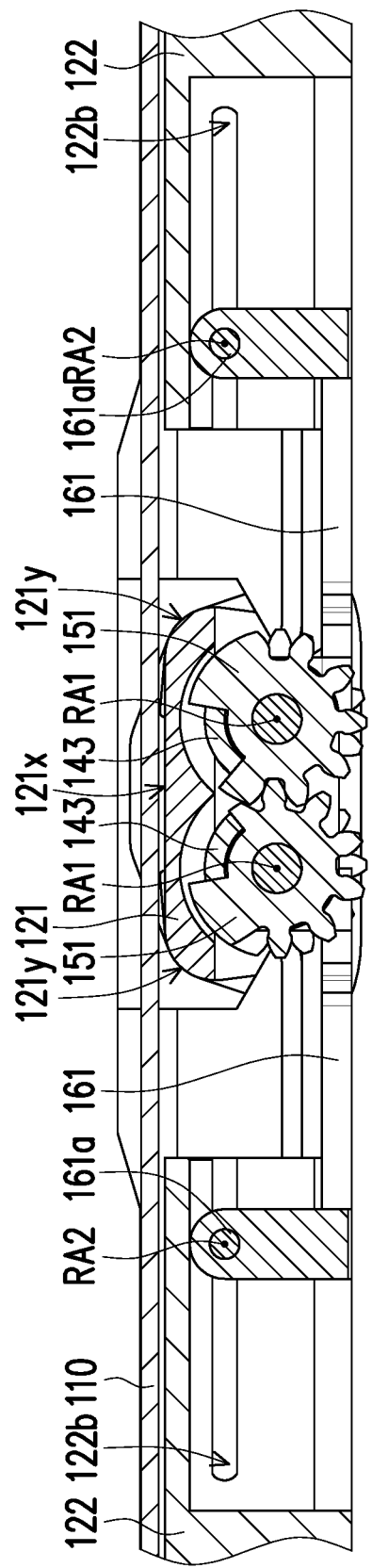
FIG. 11A to FIG. 11C are diagrams of a synchronous module and a shielding module of the foldable display device of FIG. 1A in a flattened, converted, and folded state, respectively.
Figure 11B:
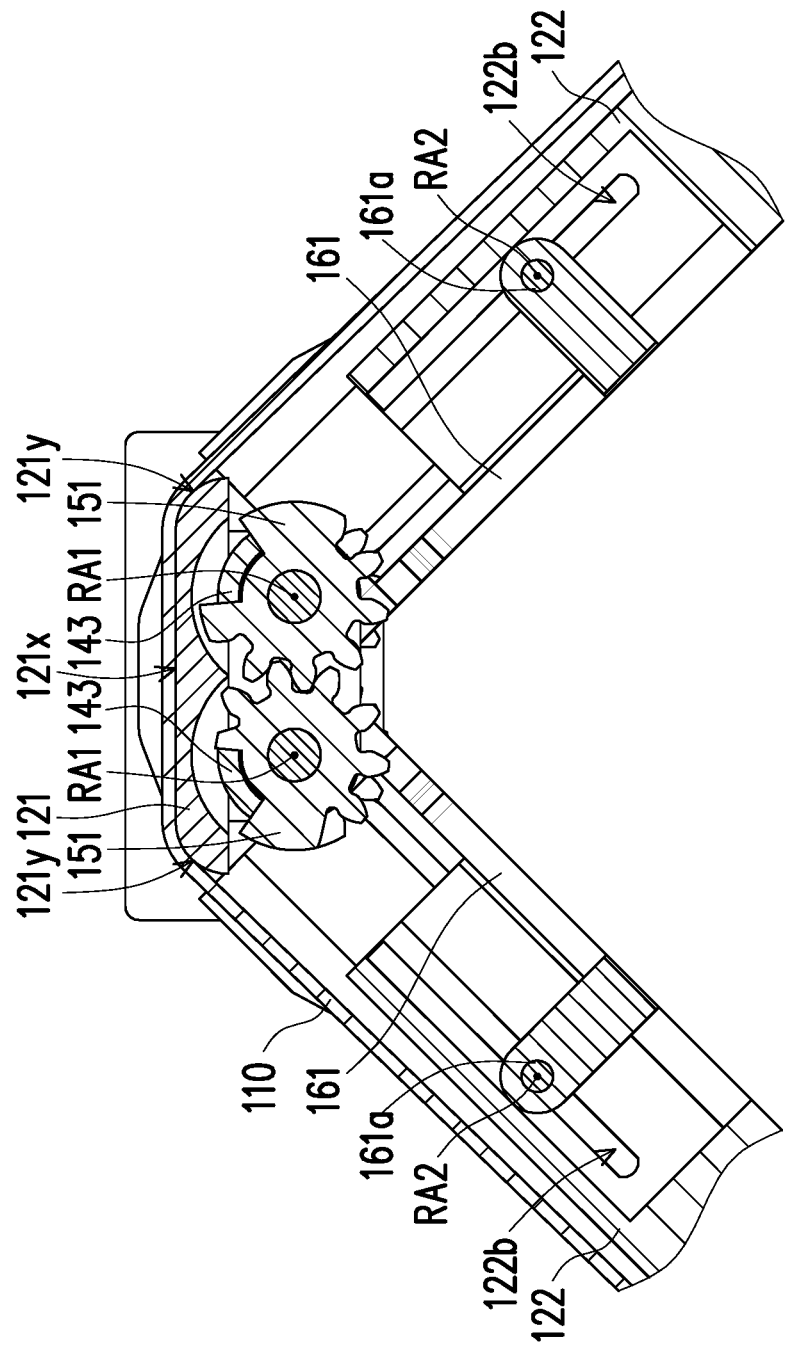
Figure 11C:
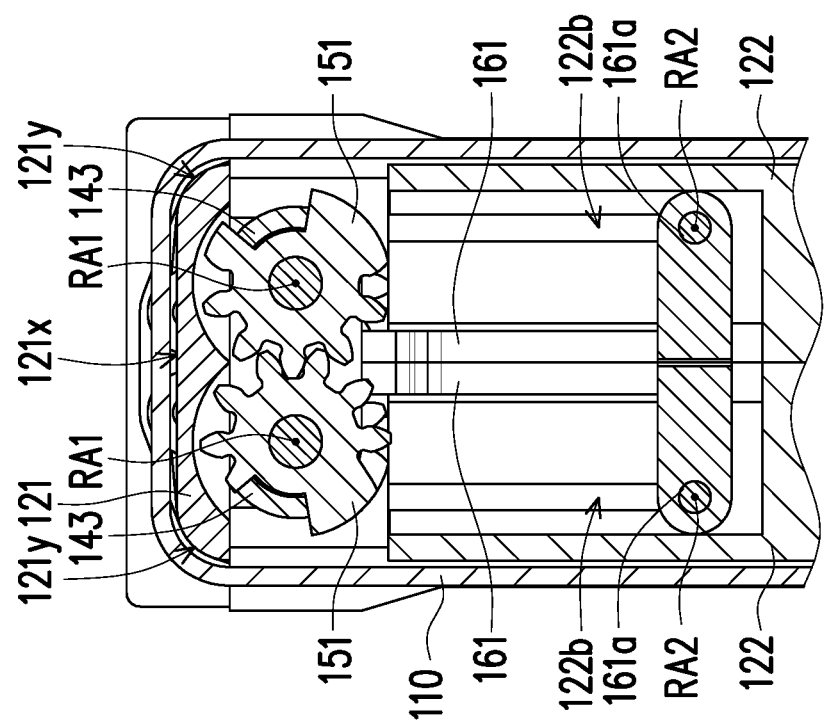

Please refer to FIG. 11A to FIG. 11C. The pair of synchronous gears 151 are respectively pivotally connected to the pair of side platforms 122 on the pair of first rotation axes RA1 and engaged with each other, so that the pair of side platforms 122 are simultaneously moved with respect to the intermediate platform 121. In the present embodiment, the pair of synchronous gears 151 are respectively fixed to the pair of shafts 142, so that the pair of shafts 142 are rotated at the same time, thereby simultaneously driving the pair of sliding members 141 of the rotating and sliding module 140 to slide inside a pair of rotating sliding grooves 122b of the pair of side platforms 122 at the same time.

Please refer to FIG. 3 and FIG. 4. In the present embodiment, the rotating and sliding module 140 may further include a pair of fixing members 143 respectively fixed to the pair of sliding members 141 and respectively coupled to the pair of synchronous gears 151. In this way, the pair of side platforms 122 are moved simultaneously with respect to the intermediate platform 121 and the pair of sliding members 141 are respectively slid simultaneously with respect to the pair of translation sliding grooves 122a. In addition, each of the pair of synchronous gears 151 has a notch 151a, and each of the pair of fixing members 143 is extended from the corresponding sliding member 141 to the notch 151a of the corresponding synchronous gear 151, so that each of the pair of sliding members 141 is rotated on the corresponding first rotation axis RA1 with the corresponding synchronous gear 151 at the same time.

Please refer to FIG. 3, FIG. 4, FIG. 5A to FIG. 5C, FIG. 6A to FIG. 6C, FIG. 7A to FIG. 7C, FIG. 8A to FIG. 8C, and FIG. 11A to FIG. 11C. In the present embodiment, the foldable display device 100 may further include a shielding module 160 disposed between the pair of side platforms 122 and the intermediate platform 121 to shield the space between the pair of side platforms 122 and the intermediate platform 121 in the flattened state (FIG. 5A, FIG. 6A, FIG. 7A, FIG. 8A, and FIG. 11A). The shielding module 160 includes a pair of shielding members 161. The pair of shielding members 161 are respectively pivotally connected to the intermediate platform 121 on the pair of first rotation axes RA1 parallel to each other and respectively rotatably slidably disposed on the pair of side platforms 122 on a pair of second rotation axes RA2 parallel to each other. The pair of first rotation axes RA1 are parallel to the pair of second rotation axes RA2. Specifically, the shielding members 161 are pivotally disposed in the intermediate platform 121 via the shafts 142 and the bearing portion 121a. In addition, the shielding members 161 have a plurality of sliding poles, and the sliding poles are respectively disposed in the rotating sliding grooves 122b of the corresponding side platforms 122.

Please refer to FIG. 11A to FIG. 11C. When the pair of side platforms 122 are respectively rotated with respect to the pair of intermediate platforms 121 on the pair of first rotation axes RA1, the pair of shielding members 161 are also respectively rotated and slid with respect to the pair of side platforms 122 on the pair of second rotation axes RA2 via the corresponding sliding poles. Therefore, in the flattened state (FIG. 11A), the pair of shielding members 161 may shield the space between the pair of side platforms 122 and the intermediate platform 121.

Figure 12:
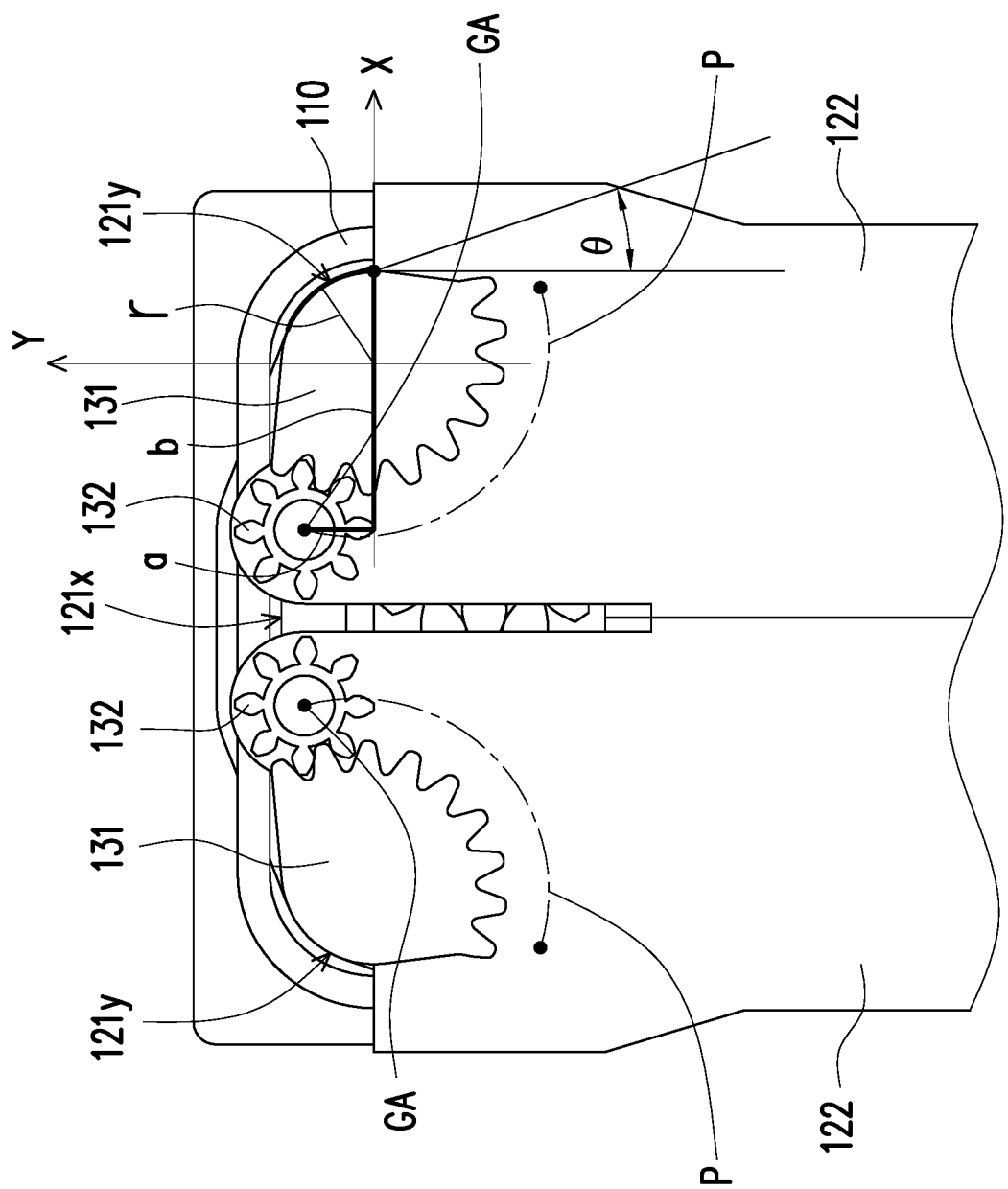
FIG. 12 is a coordinate system and structure parameters related to a motion path equation of FIG. 9C.

Please refer to FIG. 12, an X-Y Cartesian coordinate system is provided on a geometric plane perpendicular to the pair of gear axes GA (that is, the geometric plane on which the drawing is located), and the center of curvature of the guiding round surfaces 121y is used as the origin of the X-Y Cartesian coordinate system and the connecting line of the pair of gear axes GA is parallel to the X-axis. The radius of curvature of the guiding round surfaces 121y is r, which may be defined according to the specifications of the flexible display panel 110 (for example, the minimum bending radius) and the shape of the foldable display device 100, wherein r is greater than 0. The angle between a straight line extended downward along the Y-axis from the lowest point of the guiding round surfaces 121y and the flexible display panel 110 is θ. The shortest distance between the gear axes GA and a straight line passing through the center of curvature and parallel to the X-axis is a. The shortest distance between the gear axes GA and a straight line passing through the lowest point of the guiding round surfaces 121y and parallel to the Y-axis is b. The a and b above are set in accordance with the outer shape of the flexible display panel.

Figure 13:
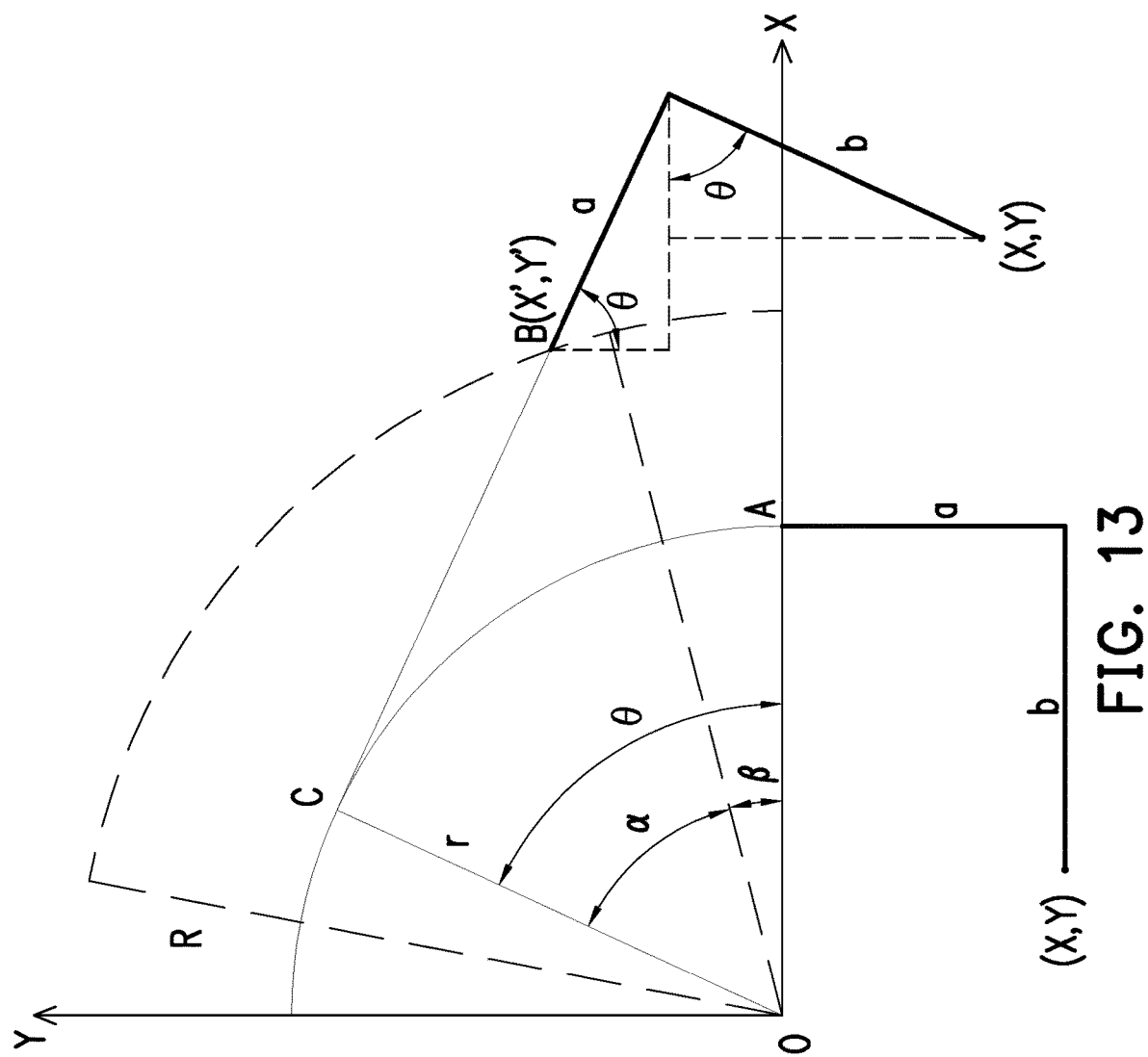
FIG. 13 is a reference diagram related to the derivation of a motion path equation.

Please refer to FIG. 13, the trajectory equations of the motion paths P are derived as follows.

$$X = X' + a \sin \theta - b \cos \theta \tag{1}$$

$$Y = Y' - a \cos \theta - b \sin \theta \tag{2}$$

$$X' = R \cos \beta \tag{3}$$

$$Y' = R \sin \beta \tag{4}$$

$$\because \cos \alpha = \frac{r}{R} \quad \therefore R = \frac{r}{\cos \alpha} \tag{5}$$

$$\because \tan \alpha = \frac{\overline{CB}}{\overline{OC}} = \frac{r\theta}{r} = \theta \quad \therefore \alpha = \tan^{-1} \theta \tag{6}$$

θ=α+β is substituted into equation (6) to obtain:

$$\beta = \theta - \tan^{-1} \theta \tag{7}$$

Putting equations (3), (5), (6), and (7) into equation (1) gives:

$$X = \frac{r \cos(\theta - \tan^{-1} \theta)}{\cos(\tan^{-1} \theta)} - a \sin \theta - b \cos \theta \tag{8}$$

Putting equations (4), (5), (6), and (7) into equation (2) gives:

$$Y = \frac{r \sin(\theta - \tan^{-1} \theta)}{\cos(\tan^{-1} \theta)} - a \cos \theta - b \sin \theta \tag{9}$$

By putting the r, a, and b into equations (8) and (9), the trajectory of the corresponding motion paths P may be obtained. Therefore, the positioning gears 131, the planetary gears 132 and other mechanism elements may be designed according to the trajectory of the motion paths P. Lastly, whether all mechanical elements may be machined and optimized and meet shape requirements is assessed. In addition, the r, a, and b may also be adjusted to meet requirements.

More specifically, the range of θ is equal to or greater than 0 degrees and less than or equal to 90 degrees, that is, the range of θ is equal to or greater than 0 and less than or equal to π/2. In other words, in the folded state, θ is 0 degrees, and in the flattened state, θ is 90 degrees. In addition, according to the geometric relative position of the planetary gears 132 and the positioning gears 131 in the folded state, the a may be entered into the above trajectory equations as a positive value, a negative value, or 0.

For more details, please refer to FIG. 12. In the folded state, when the connecting line of the gear axes GA of the two planetary gears 132 is located on the outside of the center of curvature connecting line of the guiding round surfaces 121y, the two planetary gears 132 are located in the positive direction of the Y-axis. In other words, with respect to the X-axis, the planetary gears 132 and the guiding round surfaces 121y are located on the same side. However, in order to simplify the derivation process of the trajectory equations, the two planetary gears 132 of FIG. 13 are located in the negative direction of the Y-axis, so the a value set in FIG. 12 needs to be entered into the trajectory equations as a negative value.

In another embodiment, in the coordinate system of FIG. 12 and in the folded state, when the connecting line of the gear axes GA of the two planetary gears 132 is located on the inside of the center of curvature connecting line of the guiding round surfaces 121y (not shown), that is, when the two planetary gears 132 are located in the negative direction of the Y-axis, the value of a needs to be entered into the trajectory equations as a positive value in order to obtain the motion paths P. In other words, with respect to the X-axis, the planetary gears 132 and the guiding round surfaces 121y are located on two sides of the X-axis.

In another embodiment, in the coordinate system of FIG. 12 and in the folded state, when the connecting line of the gear axes GA of the two planetary gears 132 and the center of curvature connecting line of the guiding round surfaces 121y are overlapped, the value of a is entered into the trajectory equations as 0 in order to obtain the motion paths P.

Based on the above, in the embodiments of the present application, the foldable display device may be switched to the flattened state or the folded state to provide a full-plane or half-plane display. By setting the motion paths of the planetary gears of the positioning module with respect to the positioning gears, the possibility of the flexible display panel being excessively stretched or crumpled during the switching process may be reduced to improve the service life of the flexible display panel and the flatness of the appearance.

What is claimed is:

1. A foldable display device, comprising:
a flexible display panel;
a support module, comprising:
an intermediate platform having an intermediate support surface and a pair of guiding round surfaces respectively located on two opposite sides of the intermediate support surface to support the flexible display panel; and
a pair of side platforms, each of the pair of side platforms having a side support surface to support the flexible display panel; and
at least one positioning module, comprising:
a pair of positioning gears fixed to the intermediate platform; and
a pair of planetary gears respectively fixed to the pair of side platforms on a pair of gear axes parallel to each other and engaged with the pair of positioning gears to move around the pair of positioning gears along a pair of motion paths, respectively, so that the pair of side platforms are switched between a flattened state and a folded state with respect to the intermediate platform to flatten or bend the flexible display panel, wherein the pair of motion paths are located on a geometric plane perpendicular to the pair of gear axes and are a pair of involutes symmetrical to each other.

2. The foldable display device of claim 1, wherein an X-Y Cartesian coordinate system is provided on the geometric plane perpendicular to the pair of gear axes, a center of curvature of the guiding round surfaces is used as an origin of the X-Y Cartesian coordinate system, a connecting line of the pair of gear axes is parallel to an X-axis, a radius of curvature of the guiding round surfaces is r, an angle between a straight line extended downward along a Y-axis from a lowest point of the guiding round surfaces and the flexible display panel is θ, in the folded state, a shortest distance between the gear axes and a straight line passing through the center of curvature and parallel to the X-axis is a, and a shortest distance between the gear axes and a straight line passing through the lowest point of the guiding round surfaces and parallel to the Y-axis is b, wherein the motion paths are $$X = \frac{r\cos(\theta - \tan^{-1}\theta)}{\cos(\tan^{-1}\theta)} + a\sin\theta - b\cos\theta \text{ and}$$

$$Y = \frac{r\sin(\theta - \tan^{-1}\theta)}{\cos(\tan^{-1}\theta)} - a\cos\theta - b\sin\theta,$$

when in the folded state and the connecting line of the pair of gear axes is located on an outside of the center of curvature connecting lines of the guiding round surfaces, a is entered into the equations as a negative value, and when in the folded state and the connecting line of the pair of gear axes is located on an inside the center of curvature connecting lines of the guiding round surfaces, a is entered into the equations as a positive value.

3. The foldable display device of claim 1, further comprising:
at least one rotating and sliding module, comprising:
a pair of sliding members respectively pivotally connected to the intermediate platform on a pair of rotation axes parallel to each other, wherein each of the pair of side platforms has a translation sliding groove, and the pair of sliding members are respectively coupled to the pair of translation sliding grooves.

4. The foldable display device of claim 3, further comprising:
at least one synchronous module, comprising:
a pair of synchronous gears respectively pivotally connected to the pair of side platforms on the pair of rotation axes and engaged with each other, so that the pair of side platforms are moved simultaneously with respect to the intermediate platform.

5. The foldable display device of claim 4, wherein the rotating and sliding module further comprises:
a pair of fixing members respectively fixed to the pair of sliding members and respectively coupled to the pair of synchronous gears, so that the pair of side platforms are moved simultaneously with respect to the intermediate platform and the pair of sliding members are respectively slid with respect to the pair of translation sliding grooves.

6. The foldable display device of claim 5, wherein each of the pair of synchronous gears has a notch, and each of the pair of fixing members is extended from a corresponding sliding member to the notch of the corresponding synchronous gear so that each of the pair of sliding members and the corresponding synchronous gear are rotated simultaneously on the corresponding rotation axis.

7. The foldable display device of claim 1, further comprising:
at least one synchronous module disposed between the pair of side platforms so that the pair of side platforms are moved simultaneously with respect to the intermediate platform.

8. The foldable display device of claim 7, wherein the synchronous module comprises:
a pair of synchronous gears respectively pivotally connected to the pair of side platforms on a pair of rotation axes parallel to each other and engaged with each other.

9. The foldable display device of claim 1, further comprising:
   a shielding module disposed between the pair of side platforms and the intermediate platform to shield a space between the pair of side platforms and the intermediate platform in the flattened state.

10. The foldable display device of claim 9, wherein the shielding module comprises:
   a pair of shielding members respectively pivotally connected to the intermediate platform on a pair of first rotation axes parallel to each other and respectively rotatably slidably disposed on the pair of side platforms on a pair of second rotation axes parallel to each other, wherein the pair of first rotation axes are parallel to the pair of second rotation axes.

* * * * *